US012602657B2

(12) United States Patent
Lin et al.

(10) Patent No.: US 12,602,657 B2
(45) Date of Patent: Apr. 14, 2026

(54) TOTE PROCESSING METHOD AND DEVICE, AND STORAGE MEDIUM

(71) Applicants: HAI ROBOTICS CO., LTD., Shenzhen (CN); SHENZHEN KUBO SOFTWARE CO., LTD., Shenzhen (CN)

(72) Inventors: Han Lin, Shenzhen (CN); Runfang Yu, Shenzhen (CN); Kui Wang, Shenzhen (CN)

(73) Assignees: HAI ROBOTICS CO., LTD., Shenzhen (CN); SHENZHEN KUBO SOFTWARE CO., LTD., Shenzhen (CN)

( * ) Notice: Subject to any disclaimer, the term of this patent is extended or adjusted under 35 U.S.C. 154(b) by 33 days.

(21) Appl. No.: 18/756,614

(22) Filed: Jun. 27, 2024

(65) Prior Publication Data

US 2024/0354698 A1 Oct. 24, 2024

Related U.S. Application Data

(63) Continuation of application No. PCT/CN2022/138491, filed on Dec. 12, 2022.

(30) Foreign Application Priority Data

Dec. 31, 2021 (CN) .......................... 202111679676.4

(51) Int. Cl.
*G06Q 10/087* (2023.01)
*B25J 11/00* (2006.01)
(52) U.S. Cl.
CPC .......... *G06Q 10/087* (2013.01); *B25J 11/005* (2013.01)

(58) Field of Classification Search
CPC ... G06Q 10/087; B25J 11/005; B65G 1/1373; B65G 1/04
(Continued)

(56) References Cited

U.S. PATENT DOCUMENTS 11,004,033 B1 5/2021 Theobald et al.
2019/0138978 A1* 5/2019 Johnson ............... G06Q 10/087
(Continued)

FOREIGN PATENT DOCUMENTS

CA 3011275 A1 * 1/2019 ............. B65G 1/137
CN 108137232 A 6/2018
(Continued)

OTHER PUBLICATIONS

PCT/CN2022/138491 search report mailed Feb. 23, 2023 (Year: 2023).*
(Continued)

*Primary Examiner* — Russell S Glass
(74) *Attorney, Agent, or Firm* — Ladas & Parry, LLP

(57) ABSTRACT

A tote processing method includes: obtaining at least one to-be-processed order corresponding to a target workstation; determining target totes and a carrying sequence of each of the target totes according to an order demand of the at least one to-be-processed order and a processing sequence corresponding to each to-be-processed order; and generating a carrying instruction according to the target totes and the carrying sequence of each of the target totes, to control, based on the carrying instruction, a robot to carry each of the target totes, where the order demand of the to-be-processed order includes a type and a quantity of target items corresponding to the to-be-processed order, and the processing sequence of the to-be-processed order is a processing sequence of each of the target items in the order demand of the to-be-processed order.

15 Claims, 5 Drawing Sheets

(58) Field of Classification Search
USPC .......................................................... 705/28
See application file for complete search history.

(56) References Cited

U.S. PATENT DOCUMENTS

| | | | |
|---|---|---|---|
| 2020/0239233 A1* | 7/2020 | Johnson ................. | G06Q 10/00 |
| 2020/0398528 A1* | 12/2020 | Love ........................ | D06B 3/10 |

FOREIGN PATENT DOCUMENTS

| | | | | | |
|---|---|---|---|---|---|
| CN | 108202965 A | | 6/2018 | | |
| CN | 109747897 A | * | 5/2019 | | |
| CN | 110111033 A | | 8/2019 | | |
| CN | 110533350 A | | 12/2019 | | |
| CN | 110826883 A | | 2/2020 | | |
| CN | 111824657 A | | 10/2020 | | |
| CN | 112938283 A | | 6/2021 | | |
| CN | 113044462 A | | 6/2021 | | |
| CN | 113213039 A | | 8/2021 | | |
| CN | 113689167 A | | 11/2021 | | |
| CN | 114249055 A | | 3/2022 | | |
| DE | 202020000578 U1 | | 3/2020 | | |
| WO | WO-0044649 A1 | * | 8/2000 | .......... | B65G 1/1373 |
| WO | WO-2022140694 A1 | * | 6/2022 | .......... | B65G 1/1375 |

OTHER PUBLICATIONS

International Search Report for PCT/CN2022/138491 mailed Feb. 23, 2023.
Extended European Search Report EP22914206.2 issued on Feb. 17, 2025.

* cited by examiner

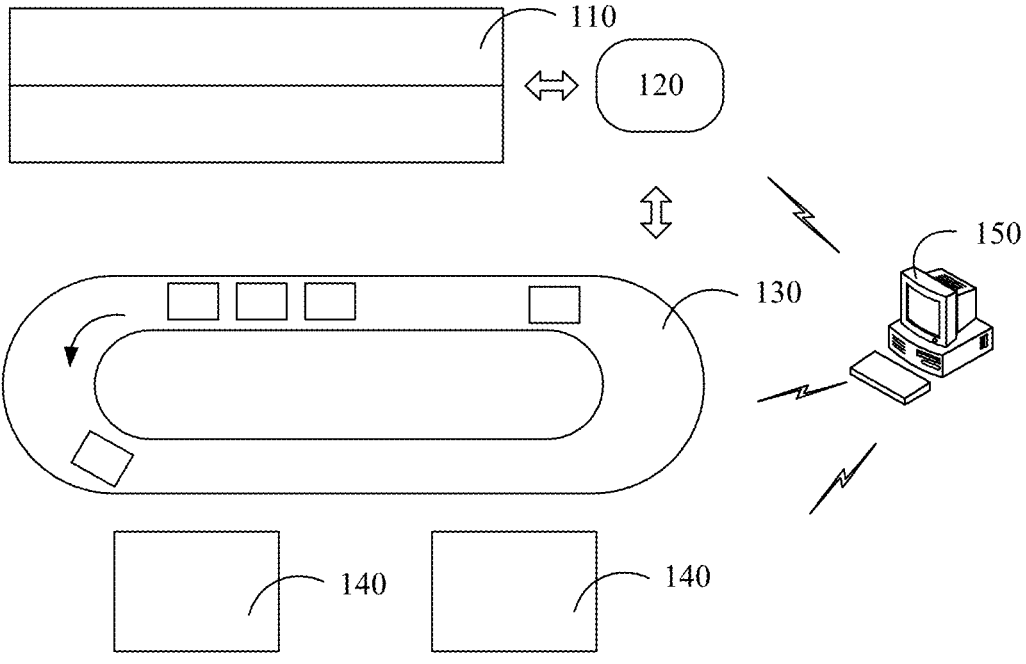

FIG. 1

| Obtain at least one to-be-processed order corresponding to a target workstation | S201 |

↓

| Determine target totes and a carrying sequence of each of the target totes according to an order demand of the at least one to-be-processed order and a processing sequence corresponding to each to-be-processed order | S202 |

↓

| Generate a carrying instruction according to each of the target totes and the carrying sequence of each of the target totes, to control, based on the carrying instruction, a robot to carry each of the target totes | S203 |

FIG. 2

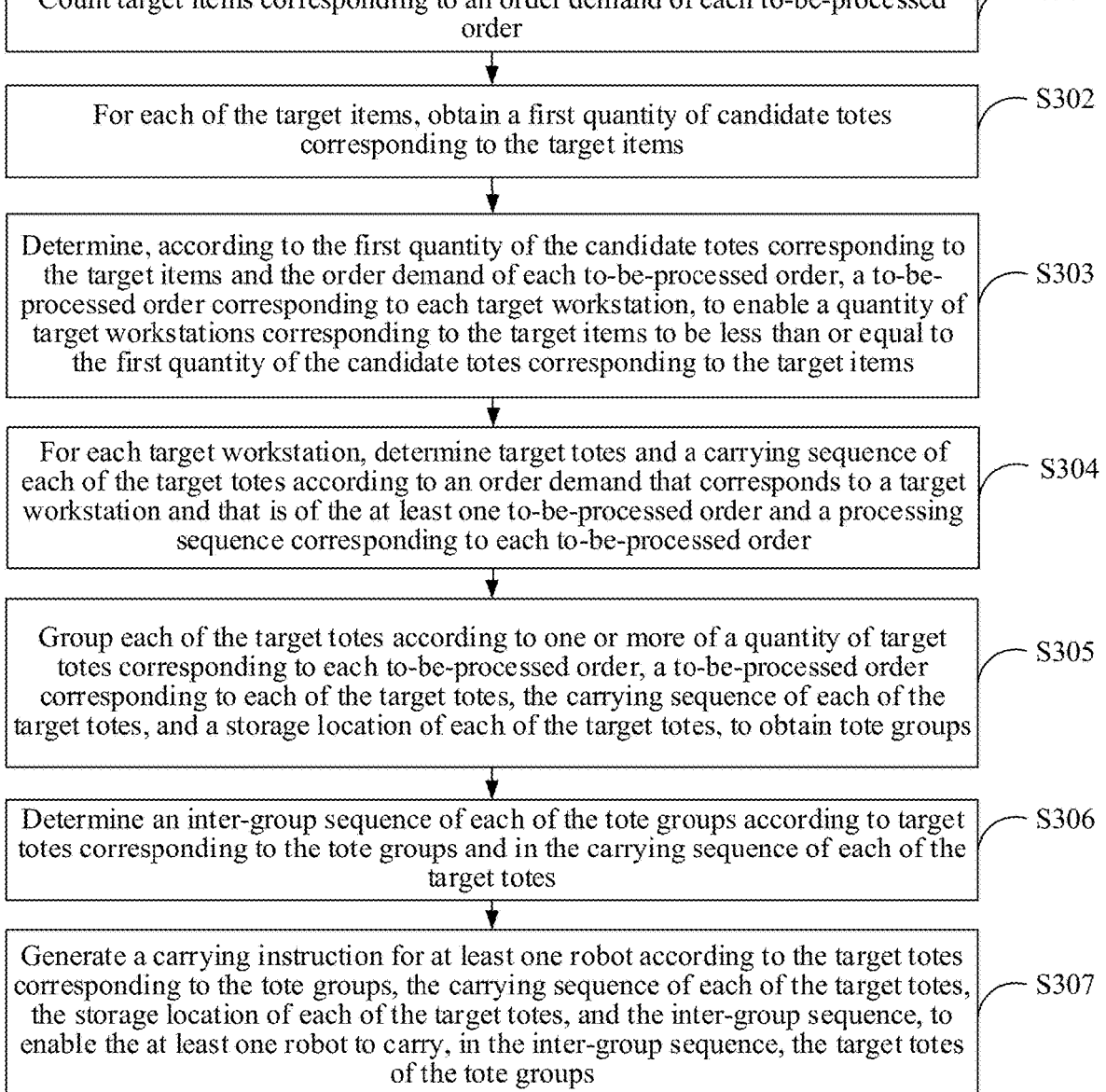

Count target items corresponding to an order demand of each to-be-processed order ⟋ S301

For each of the target items, obtain a first quantity of candidate totes corresponding to the target items ⟋ S302

Determine, according to the first quantity of the candidate totes corresponding to the target items and the order demand of each to-be-processed order, a to-be-processed order corresponding to each target workstation, to enable a quantity of target workstations corresponding to the target items to be less than or equal to the first quantity of the candidate totes corresponding to the target items ⟋ S303

For each target workstation, determine target totes and a carrying sequence of each of the target totes according to an order demand that corresponds to a target workstation and that is of the at least one to-be-processed order and a processing sequence corresponding to each to-be-processed order ⟋ S304

Group each of the target totes according to one or more of a quantity of target totes corresponding to each to-be-processed order, a to-be-processed order corresponding to each of the target totes, the carrying sequence of each of the target totes, and a storage location of each of the target totes, to obtain tote groups ⟋ S305

Determine an inter-group sequence of each of the tote groups according to target totes corresponding to the tote groups and in the carrying sequence of each of the target totes ⟋ S306

Generate a carrying instruction for at least one robot according to the target totes corresponding to the tote groups, the carrying sequence of each of the target totes, the storage location of each of the target totes, and the inter-group sequence, to enable the at least one robot to carry, in the inter-group sequence, the target totes of the tote groups ⟋ S307

FIG. 3

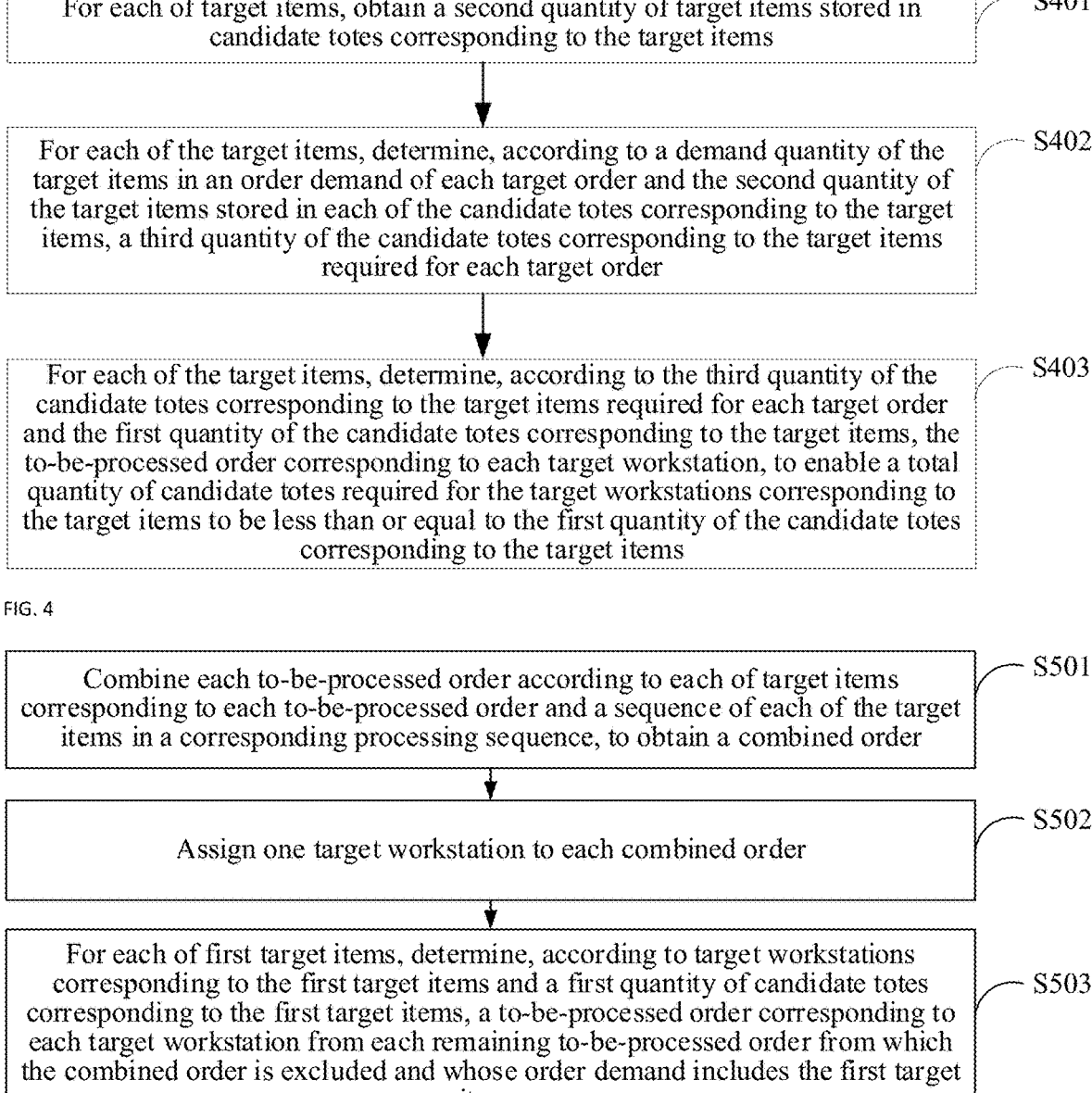

For each of target items, obtain a second quantity of target items stored in candidate totes corresponding to the target items  ⌐ S401

For each of the target items, determine, according to a demand quantity of the target items in an order demand of each target order and the second quantity of the target items stored in each of the candidate totes corresponding to the target items, a third quantity of the candidate totes corresponding to the target items required for each target order  ⌐ S402

For each of the target items, determine, according to the third quantity of the candidate totes corresponding to the target items required for each target order and the first quantity of the candidate totes corresponding to the target items, the to-be-processed order corresponding to each target workstation, to enable a total quantity of candidate totes required for the target workstations corresponding to the target items to be less than or equal to the first quantity of the candidate totes corresponding to the target items  ⌐ S403

FIG. 4

Combine each to-be-processed order according to each of target items corresponding to each to-be-processed order and a sequence of each of the target items in a corresponding processing sequence, to obtain a combined order  ⌐ S501

Assign one target workstation to each combined order  ⌐ S502

For each of first target items, determine, according to target workstations corresponding to the first target items and a first quantity of candidate totes corresponding to the first target items, a to-be-processed order corresponding to each target workstation from each remaining to-be-processed order from which the combined order is excluded and whose order demand includes the first target items  ⌐ S503

FIG. 5

TOTE PROCESSING METHOD AND DEVICE, AND STORAGE MEDIUM

CROSS-REFERENCES

This application is a continuation of International Patent Application No. PCT/CN2022/138491 filed on Dec. 12, 2022, which claims priority to Chinese Patent Application No. 202111679676.4 filed on Dec. 31, 2021, which is incorporated herein by reference in its entirety.

TECHNICAL FIELD

This application relates to the field of intelligent warehousing technologies, and in particular, to a tote processing method and device, and a storage medium.

BACKGROUND OF THE INVENTION

A robot-based warehousing system implements automatic retrieving and storing of goods through system instructions by using an intelligent operating system. In addition, the robot-based warehousing system can operate uninterruptedly 24 hours a day, and replaces manual management and operation, thereby improving efficiency of warehousing, and being widely used and favored.

When receiving an order, the warehousing system needs to perform inventory assignment based on an order demand of the order, to determine totes required for the order, and then control a robot to carry the totes to a workstation for processing such as sorting, to complete the order. For an order that has a requirement on a processing sequence, when picking is performed in the foregoing order processing manner, a case in which a tote corresponding to an item ranking bottom reaches the workstation before a tote corresponding to an item ranking top may occur in the processing sequence. Then, picking sorting needs to be performed again in manners such as secondary sorting. As a result, order processing efficiency is low, and cannot meet a demand.

SUMMARY OF THE INVENTION

This application provides a tote processing method, apparatus, and device, a warehousing system, and a storage medium, to determine a carrying sequence of totes based on a processing sequence set by an order, so that totes matching the processing sequence are sequentially placed on a workstation, which improves smoothness of sorting performed by the workstation and efficiency of order processing.

According to a first aspect, an embodiment of this application provides a tote processing method. The method includes: obtaining at least one to-be-processed order corresponding to a target workstation; determining target totes and a carrying sequence of each of the target totes according to an order demand of the at least one to-be-processed order and a processing sequence corresponding to each to-be-processed order; and generating a carrying instruction according to the target totes and the carrying sequence of each of the target totes, to control, based on the carrying instruction, a robot to carry each of the target totes, where the order demand of the to-be-processed order includes a type and a quantity of target items corresponding to the to-be-processed order, the processing sequence of the to-be-processed order is a processing sequence of the target items in the order demand of the to-be-processed order, and each of the target totes corresponds to one of the to-be-processed orders or corresponds to one target item in the order demand of one of the to-be-processed orders.

Optionally, the determining the target totes and the carrying sequence of each of the target totes according to the order demand of the at least one to-be-processed order and the processing sequence corresponding to each to-be-processed order includes: for each to-be-processed order, determining each of the target totes of the to-be-processed order and the carrying sequence of each of the target totes according to the order demand and the processing sequence of the to-be-processed order.

Correspondingly, the generating the carrying instruction according to the target totes and the carrying sequence of each of the target totes includes: generating a carrying instruction for at least one robot according to each of the target totes corresponding to each to-be-processed order, the carrying sequence of each of the target totes, and a storage location of each of the target totes.

Optionally, the generating the carrying instruction for the at least one robot according to each of the target totes corresponding to each to-be-processed order, the carrying sequence of each of the target totes, and the storage location of each of the target totes includes: grouping each of the target totes according to one or more of a quantity of target totes corresponding to each to-be-processed order, the to-be-processed order corresponding to each of the target totes, the carrying sequence of each of the target totes, and the storage location of each of the target totes, to obtain tote groups; determining an inter-group sequence of each of the tote groups according to target totes corresponding to the tote groups and in the carrying sequence of each of the target totes, where the inter-group sequence is used to describe an execution sequence of each of the tote groups, and in the inter-group sequence, if a first tote in a tote group of a current sequence and a second tote in a tote group of a next sequence belong to a same to-be-processed order, a sequence of the first tote in the carrying sequence is before a sequence of the second tote in the carrying sequence; and generating the carrying instruction for the at least one robot according to the target totes corresponding to the tote groups, the carrying sequence of each of the target totes, the storage location of each of the target totes, and the inter-group sequence, to enable the at least one robot to carry, in the inter-group sequence, the target totes of the tote groups.

Optionally, the grouping each of the target totes according to one or more of the quantity of target totes corresponding to each to-be-processed order, the to-be-processed order corresponding to each of the target totes, the carrying sequence of each of the target totes, and the storage location of each of the target totes, to obtain the tote groups includes: obtaining the quantity of target totes corresponding to each to-be-processed order; and for each to-be-processed order, grouping, according to the quantity of target totes corresponding to the to-be-processed order and the carrying sequence of each of the target totes, each of the target totes corresponding to the to-be-processed order, to obtain at least one tote group.

Optionally, the method further includes: when a quantity of target totes in a tote group corresponding to the to-be-processed order is less than a first preset quantity, combining each of the target totes in at least one next to-be-processed order with the tote group of the to-be-processed order in the carrying sequence of the each of the target totes, to enable the quantity of target totes in the tote group of the to-be-processed order to be in a first interval, where a lower limit of the first interval is the first preset quantity, and an upper limit of the first interval is a second preset quantity.

Optionally, the grouping, according to the quantity of target totes corresponding to the to-be-processed order and the carrying sequence of each of the target totes, each of the target totes corresponding to the to-be-processed order, to obtain the at least one tote group includes: when the quantity of target totes corresponding to the to-be-processed order is greater than a first preset quantity, grouping, in the carrying sequence of each of the target totes corresponding to the to-be-processed order and the storage location of each of the target totes, each of the target totes corresponding to the to-be-processed order, to obtain at least two tote groups, where the storage location of each of the target totes corresponding to a same tote group is in a preset range.

Optionally, the grouping each of the target totes according to one or more of each of the target totes corresponding to each to-be-processed order, the carrying sequence of each of the target totes, and the storage location of each of the target totes, to obtain the tote groups includes: grouping each of the target totes into a plurality of tote groups according to the storage location of each of the target totes and in the carrying sequence corresponding to each of the target totes, where a quantity of target totes corresponding to each of the tote groups is in a first interval, each of the target totes corresponding to each of the tote groups is in a preset range, and a sequence of each of the target totes corresponding to a same to-be-processed order in each of the tote groups is consecutive in the carrying sequence; a lower limit of the first interval is a first preset quantity, and an upper limit of the first interval is a second preset quantity; a third tote in a first tote group and a fourth tote in a second tote group belong to a first order, and a fifth tote in the first tote group and a sixth tote in the second tote group belong to a second order; a sequence of the third tote in the carrying sequence is before a sequence of the fourth tote in the carrying sequence, and then a sequence of the fifth tote in the carrying sequence is before a sequence of the sixth tote in the carrying sequence; and the first tote group and the second tote group are different tote groups, and the first order and the second order are different to-be-processed orders.

Optionally, the determining the inter-group sequence of each of the tote groups according to the target totes corresponding to the tote groups and in the carrying sequence of each of the target totes includes: determining the inter-group sequence of each of the tote groups according to a sequence of each of the target totes of at least one third order corresponding to each of the tote groups in a carrying sequence corresponding to the at least one third order, where each of the target totes corresponding to the third order exists in at least two tote groups.

Optionally, in two tote groups that are adjacent in the inter-group sequence, target totes belonging to the same to-be-processed order are consecutive in a sequence of the carrying sequence.

Optionally, the generating the carrying instruction for the at least one robot according to the target totes corresponding to the tote groups, the carrying sequence of each of the target totes, the storage location of each of the target totes, and the inter-group sequence, to enable the at least one robot to carry, in the inter-group sequence, the target totes of the tote groups includes: for each of the tote groups, determining a retrieving sequence of each of the target totes in the tote group according to the storage location of each of the target totes in the tote group and a sequence of each of the target totes in the tote group in a corresponding carrying sequence; and generating the carrying instruction for each of the robots according to the target totes corresponding to the tote groups, the carrying sequence of each of the target totes, the storage location of each of the target totes, the inter-group sequence, and a retrieving sequence corresponding to each of the tote groups, to enable each of the robots to sequentially retrieve, in the inter-group sequence and the retrieving sequence, the target totes in the tote groups.

Optionally, the method further includes: determining, according to the order demand of each to-be-processed order, the target workstation corresponding to each to-be-processed order, to obtain the to-be-processed order corresponding to each target workstation.

Optionally, the determining, according to the order demand of each to-be-processed order, the to-be-processed order corresponding to each target workstation includes: counting target items corresponding to the order demand of each to-be-processed order; for each of the target items, obtaining a first quantity of candidate totes corresponding to the target items, where the candidate tote is a tote in a warehousing system in which the target items are stored and does not correspond to any order; and determining, according to the first quantity of the candidate totes corresponding to the target items and the order demand of each to-be-processed order, the to-be-processed order corresponding to each target workstation, to enable a quantity of target workstations corresponding to the target items to be less than or equal to the first quantity of the candidate totes corresponding to the target items.

Optionally, the determining, according to the first quantity of the candidate totes corresponding to the target items and the order demand of each to-be-processed order, the to-be-processed order corresponding to each target workstation, to enable the quantity of target workstations corresponding to the target items to be less than or equal to the first quantity of the candidate totes corresponding to the target items includes: for each of the target items, obtaining a second quantity of target items stored in each of the candidate totes corresponding to the target items; for each of the target items, determining, according to a demand quantity of the target items in an order demand of each target order and the second quantity of the target items stored in each of the candidate totes corresponding to the target items, a third quantity of the candidate totes corresponding to the target items required for each target order, where the target order is a to-be-processed order whose order demand includes the target items; and for each of the target items, determining, according to the third quantity of the candidate totes corresponding to the target items required for each target order and the first quantity of the candidate totes corresponding to the target items, the to-be-processed order corresponding to each target workstation, to enable a total quantity of candidate totes required for the target workstations corresponding to the target items to be less than or equal to the first quantity of the candidate totes corresponding to the target items.

Optionally, the determining, according to the first quantity of the candidate totes corresponding to the target items and the order demand of each to-be-processed order, the to-be-processed order corresponding to each target workstation includes: combining each to-be-processed order according to each of the target items corresponding to each to-be-processed order and a sequence of each of the target items in a corresponding processing sequence, to obtain a combined order; assigning one target workstation to each combined order; and for each of first target items, determining, according to target workstations corresponding to the first target items and a first quantity of candidate totes corresponding to the first target items, the to-be-processed order corresponding to each target workstation from each remaining to-be-processed order from which the combined order is excluded and whose order demand includes the first target items, where the first target items are target items of a same type in the order demand of the to-be-processed order and an order demand of at least one combined order.

Optionally, the combining each to-be-processed order according to each of the target items corresponding to each to-be-processed order and the sequence of each of the target items in the corresponding processing sequence, to obtain the combined order includes: if a type of target items corresponding to an order demand of a first to-be-processed order and a type of target items corresponding to an order demand of a second to-be-processed order are the same, combining the first to-be-processed order and the second to-be-processed order, to obtain the combined order; or if only a type of target items ranking bottom in a preset sequence of the processing sequence is different among target items corresponding to an order demand of a first to-be-processed order and an order demand of a second to-be-processed order, combining the first to-be-processed order and the second to-be-processed order, to obtain the combined order.

According to a second aspect, an embodiment of this application further provides a tote processing apparatus. The apparatus includes: an order obtaining module, configured to obtain at least one to-be-processed order corresponding to a target workstation; a tote determining module, configured to determine target totes and a carrying sequence of each of the target totes according to an order demand of the at least one to-be-processed order and a processing sequence corresponding to each to-be-processed order; and a carrying control module, configured to generate a carrying instruction according to the target totes and the carrying sequence of each of the target totes, to control, based on the carrying instruction, a robot to carry each of the target totes, where the order demand of the to-be-processed order includes a type and a quantity of target items corresponding to the to-be-processed order, the processing sequence corresponding to the to-be-processed order is a processing sequence of the target items in the order demand of the to-be-processed order, and each of the target totes corresponds to one of the to-be-processed orders or corresponds to one target item in the order demand of one of the to-be-processed orders.

According to a third aspect, an embodiment of this application further provides a tote processing device, including: a memory and at least one processor, where the memory stores computer-executable instructions; and the at least one processor executes the computer-executable instructions stored in the memory, to enable the at least one processor to perform the tote processing method according to any embodiment corresponding to the first aspect of this application.

According to a fourth aspect, an embodiment of this application further provides a warehousing system, including: a robot, a workstation, and the tote processing device according to an embodiment corresponding to the third aspect of this application.

According to a fifth aspect, an embodiment of this application further provides a computer-readable storage medium. The computer-readable storage medium stores computer-executable instructions; and when a processor executes the computer-executable instructions, the tote processing method according to any embodiment corresponding to the first aspect of this application is performed.

According to a sixth aspect, an embodiment of this application further provides a computer program product, including a computer program; and when the computer program is executed by a processor, the tote processing method according to any embodiment corresponding to the first aspect of this application is performed.

The embodiments of this application provide a tote processing method, apparatus, and device, a warehousing system, and a storage medium. For a scenario in which the target workstation receives each to-be-processed order that has a requirement on the processing sequence, namely, a scenario in which each of the target items in the order demand of the to-be-processed order needs to be processed in the processing sequence of the to-be-processed order. Based on the order demand of each to-be-processed order and the processing sequence corresponding to each to-be-processed order, each of the target totes to be carried to the target workstation is determined, to enable each of the target totes to correspond to only one to-be-processed order or correspond to only one target item in the order demand of one to-be-processed order, and determine the carrying sequence of each of the target totes, thereby controlling the robot to sequentially carry or place, in the carrying sequence, each of the target totes on the target workstation, to prevent the target totes ranking bottom in the processing sequence from reaching the target workstation before the target totes ranking top in the processing sequence, which leads to a phenomenon that the workstation suspends operations. In addition, by limiting that each of the target totes corresponds to only one to-be-processed order or one demand of one to-be-processed order, a case in which a plurality of to-be-processed orders or a plurality of demands contend for the same target tote is avoided, thereby ensuring orderliness and smoothness of tote processing, and improving smoothness of sorting by the workstation and order processing efficiency.

BRIEF DESCRIPTION OF DRAWINGS

Accompanying drawings herein are incorporated into a specification and constitute a part of this specification, show embodiments that conform to this application, and are used for describing a principle of this application together with this specification.

FIG. 1 is an application scenario diagram of a tote processing method according to an embodiment of this application;

FIG. 2 is a flowchart of a tote processing method according to an embodiment of this application;

FIG. 3 is a flowchart of a tote processing method according to another embodiment of this application;

FIG. 4 is a flowchart of an implementation of step S303 in the embodiment shown in FIG. 3 according to this application;

FIG. 5 is a flowchart of another implementation of step S303 in the embodiment shown in FIG. 3 according to this application;

Figure 6:
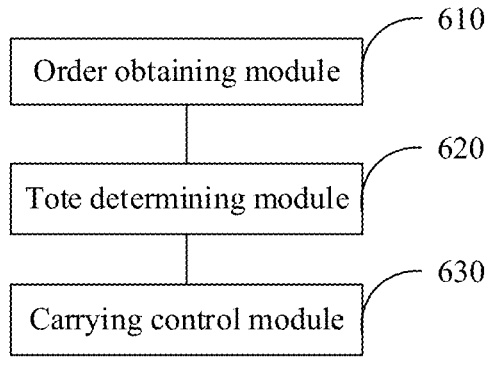
FIG. 6 is a schematic diagram of a structure of a tote processing apparatus according to an embodiment of this application.

Explicit embodiments of this application are shown by using the foregoing accompanying drawings, and more detailed descriptions are provided below. The accompanying drawings and literal descriptions are not intended to limit the scope of the idea of this application in any manner, but explain the concept of this application by referring to specific embodiments for a person skilled in the art.

DETAILED DESCRIPTION

Exemplary embodiments are described herein in detail, and examples of the embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

The following describes the technical solutions of this application and how to resolve the foregoing technical issues according to the technical solutions of this application in detail by using specific embodiments. The following several specific embodiments may be combined with each other, and the same or similar concepts or processes may not be described repeatedly in some embodiments. The following describes the embodiments of this application with reference to the accompanying drawings.

The application scenarios of the embodiments of this application are described below.

FIG. 1 is an application scenario diagram of a tote processing method according to an embodiment of this application. As shown in FIG. 1, the tote processing method provided in this embodiment of this application may be performed by a tote processing device. The tote processing device may be a dispatching device of a warehousing system, and a form of the tote processing device may be a computer or a server. A storage shelving unit 110, a robot 120, a conveyor 130, a workstation 140, and a dispatching device 150 are usually set in a warehousing system. The dispatching device 150 is configured to assign the workstation 140 to an order, and is further configured to assign totes stored on the storage shelving unit 110 to an outbound order, so that the robot 120 carries a tote corresponding to the outbound order to a conveyor 130 connected to a workstation 140 corresponding to the outbound order. The tote corresponding to the outbound order is transported, through the conveyor 130, to the workstation corresponding to the outbound order, so that goods stored in the tote are sorted through the workstation, to complete the outbound order.

In some embodiments, the conveyor 130 may be omitted, and the robot 120 directly places the tote on the workstation 140.

In some embodiments, only goods with one SKU (Stock Keeping Unit) or only goods of one type may be stored in one tote.

When a quantity of outbound orders is large, the workstation 140 corresponds to a plurality of outbound orders. In some embodiments, the workstation 140 is often used as a unit, and each outbound order received by the workstation 140 is considered as a whole, so that the totes are assigned based on an order demand of each outbound order, to determine a tote that needs to be carried by the robot 120 to the workstation 140. Therefore, the robot 120 performs path planning based on a storage location of each tote on the storage shelving unit 110, to retrieve each tote corresponding to the workstation 140.

In some embodiments, a sequence in which the goods are retrieved is set in the outbound order. Because only goods with one SKU of are stored in one tote, the outbound order limits a sequence in which the totes reach the workstation. It cannot be ensured that the totes reach the workstation 140 in a sequence required for each order by controlling, in the foregoing manner, the robot 120 to carry the totes. To retrieve the goods in the sequence limited by the order, order processing steps are added, and order processing efficiency is low and cannot meet the demand.

In some embodiments, goods with a plurality of SKUs or a plurality of goods may be stored in one tote.

In some embodiments, one tote may be hit by a plurality of outbound orders or assigned to a plurality of outbound orders, that is, the tote is determined as a tote required for the plurality of outbound orders.

In some embodiments, an order demand of one outbound order may include demands of a plurality of goods or a plurality of SKUs. One tote may be hit by a plurality of demands of one outbound order or the demands of the plurality of SKUs. That is, at least two goods stored in the tote are at least two goods required in the order demands of one outbound order, or goods with at least two SKUs in the order demands of one outbound order are stored in the tote.

Because there is a limitation on a processing sequence of the outbound order, various items need to be sequentially sorted in the processing sequence. If the same tote is hit by the demands of the plurality of SKUs of one outbound order, and a processing sequence corresponding to the demands of the plurality of SKUs that are hit is not continuous, the tote travels between the workstation of the outbound order and the storage shelving unit a plurality of times. In addition, due to a requirement for the processing sequence, processing of the outbound order is interrupted. This reduces processing efficiency of the outbound order.

If the same tote is hit by the demands of the plurality of outbound orders of the same workstation or the plurality of outbound orders of different workstations, because the processing sequence of different outbound orders may be different, the tote also needs to travel between the workstation and the storage shelving unit a plurality of times, or needs to perform conveying between a plurality of workstations. In addition, when the items stored in the tote are processed in the processing sequence according to the outbound order, it needs to wait for processing on the tote is finished according to a previous outbound order before the items are transferred, through the tote, to the workstation corresponding to the outbound order. As a result, a processing procedure of the outbound order is interrupted. This reduces overall processing efficiency of the outbound order.

To improve the processing efficiency of the outbound order, an embodiment of this application provides a tote processing method. A main concept of the method is: For a plurality of to-be-processed orders received by the target workstation, target totes and a carrying sequence of each of the target totes are determined based on the order demand of each to-be-processed order and the processing sequence corresponding to each to-be-processed order, thereby ensuring that the robot places, in the carrying sequence, each of the target tote on the target workstation or a conveyor connected to the target workstation, so that each to-be-processed order is continuously executed, and the order processing efficiency is improved.

FIG. 2 is a flowchart of a tote processing method according to an embodiment of this application. As shown in FIG. 2, the tote processing method may be performed by a tote processing device. The tote processing method provided in this embodiment includes the following steps.

Step S201: Obtain at least one to-be-processed order corresponding to a target workstation.

The target workstation may be any one or more workstations in a warehousing system to which to-be-processed orders are issued. The to-be-processed orders may be orders such as warehouse management orders and outbound orders that require carrying totes to the corresponding target workstations. An order demand of the to-be-processed order includes a type and a quantity of target items corresponding to the to-be-processed order. The target items are the items that need to be retrieved in the to-be-processed order and that are stored in the totes on the storage shelving unit of the warehousing system, which may be clothes, cosmetics, vehicle components, and the like.

In some embodiments, the tote may include a plurality of grids. Each grid is an independent storage space, and one grid may be configured to store items with a same SKU. Items with a plurality of SKUs may be placed in each tote.

In some embodiments, the storage shelving unit of the warehousing system is multi-layered, and SKUs of items stored in the totes stored on a same layer of the storage shelving unit meet the foregoing set condition.

Specifically, when receiving each to-be-processed order, a dispatching device of the warehousing system may assign a workstation to each to-be-processed order, thereby obtaining a target workstation corresponding to each to-be-processed order, or obtaining a to-be-processed order corresponding to each target workstation.

Optionally, according to the order demand of each to-be-processed order, the target workstation corresponding to each to-be-processed order may be determined, to obtain the to-be-processed order corresponding to each target workstation.

Specifically, different workstations or types or SKUs of items suitable for processing may be preset, so that based on the SKUs of the target items in the order demand of each to-be-processed order, a workstation adapted to each to-be-processed order may be determined, and each to-be-processed order is issued to the adapted workstation.

Further, if the to-be-processed order corresponds to a plurality of adapted workstations, a nearest adapted workstation may be further determined as the target workstation of the to-be-processed order based on a distance between an area in which the tote of each of the target items in the order demand of the to-be-processed order is stored and each of the adapted workstations.

Further, if the to-be-processed order corresponds to the plurality of adapted workstations, the target workstation of the to-be-processed order may be further determined from the plurality of adapted workstations based on the distance between the area in which the tote storing the target items in the order demand of the to-be-processed order is located and each adapted workstation, and an order priority of the to-be-processed order.

The order priority may be set by the system, or may be determined based on a deadline of the to-be-processed order, a priority of a corresponding user, and the like.

Specifically, the dispatching device may assign, according to a set period, a target workstation to each received to-be-processed order, or assign a target workstation to each to-be-processed order in an order pool when a quantity of to-be-processed orders in the order pool of the dispatching device reaches a specific quantity, or when there is a small quantity of orders in the target workstation.

Step S202: Determine target totes and a carrying sequence of each of the target totes according to an order demand of the at least one to-be-processed order and a processing sequence corresponding to each to-be-processed order.

Each of the target totes corresponds to one of the to-be-processed orders or corresponds to one target item in the order demand of one of the to-be-processed orders. In other words, each target tote may be hit by only one to-be-processed order or by one SKU or one target item in an order demand of one to-be-processed order, thereby avoiding a phenomenon that one target tote corresponds to a plurality of orders.

Specifically, if a tote is hit by one of the to-be-processed orders, that is, the tote is determined as the target tote of one of the to-be-processed orders, the tote is not considered when a target tote is assigned to another to-be-processed order.

Specifically, if goods stored in the tote meet a first demand and a second demand of the to-be-processed order, the tote may be determined as a target tote corresponding to the first demand and the second demand of the to-be-processed order. That is, the tote is hit by the first demand and the second demand of the to-be-processed order. Types or SKUs of goods required for the first demand and the second demand are different, and processing sequences of the types of the goods required for the first demand and the second demand are consecutive in the to-be-processed order.

For example, two to-be-processed orders are used as an example. An order demand of a to-be-processed order D1 is ten pieces of clothes C1 in size S and 20 pieces of clothes C1 in size M. An order demand of a to-be-processed order D2 is ten pieces of clothes C1 in size S, eight pieces of clothes C1 in size M, and 12 pieces of clothes C1 in size L. Processing sequences of the clothes in the to-be-processed order D1 and the to-be-processed order D2 is L, M, and S, so that when being put on the shelves, the clothes may be directly put on the shelves based on a sequence when the clothes are retrieved, thereby avoiding a step of manual tallying, and improving efficiency of goods placement. Totes storing the clothes C1 in the warehousing system include: a tote L1 (20 pieces of clothes C1 in size S and 20 pieces of clothes C1 in size M), a tote L2 (15 pieces of clothes C1 in size S and 15 pieces of clothes C1 in size L), and a tote L3 (ten pieces of clothes C1 in size S and 14 pieces of clothes C1 in size M). Because the order demand of the to-be-processed order D1 includes two SKUs, a processing sequence of the to-be-processed order D1 is consecutive, and the tote L1 meets a demand of the to-be-processed order D1 for the clothes C1 in size S and the clothes C1 in size M. Then, only the tote L1 may be determined as the target tote of the to-be-processed order D1. For the to-be-processed order D2, although the tote L2 simultaneously meets the demand of the to-be-processed order D2 for the two SKUs including the clothes C1 in size S and the clothes C1 in size L, because processing sequences of the clothes C1 in size S and the clothes C1 in size L are not consecutive, if the tote L2 is determined as a target tote of the clothes C1 in size S and the clothes C1 in size L in the order demand of the to-be-processed order D2, the tote L2 needs to be transferred out of the workstation after meeting the demand of the to-be-processed order D2 for the clothes C1 in size S, to sort the clothes C1 in size M in the to-be-processed order D2. Then, the tote L2 may be transferred to the workstation to sort the clothes C1 in size L, to meet the demand of the to-be-processed order D2 for the clothes C1 in size L. The tote L2 needs to be transferred a plurality of times, and a transfer path is often long. This prolongs processing duration of the to-be-processed order D2, so that only the tote L2 may be determined as the target tote for the clothes C1 in size S or the clothes C1 in size L in the order demand of the to-be-processed order D2. Considering a storage case of the tote L3, the tote L2 is determined as the target tote for the clothes C1 in size L in the order demand of the to-be-processed order D2. Because processing sequences of the clothes C1 in size S and the clothes C1 in size M are consecutive, the tote L3 may be determined as the target tote for the clothes C1 in size S and the clothes C1 in size M in the order demand of the to-be-processed order D2.

The carrying sequence may be a sequence in which a dispatching system assigns a carrying task to the robot for the target tote, or may be a sequence in which each target tote is carried by the robot. The processing sequence of the to-be-processed order is a processing sequence of each of the target items in the order demand of the to-be-processed order, namely, a placement sequence after each of the target items is picked. The carrying sequence is for the target tote, and the processing sequence is for the SKU or a type of goods.

For example, the processing sequence of the to-be-processed order may be SKU1-SKU2-SKU3. Required or hit totes of a demand corresponding to a to-be-processed order SKU1 are: a target tote 1 and a target tote 3. A required or hit tote of a demand corresponding to a to-be-processed order SKU2 is: a target tote 5. Required or hit totes of a demand corresponding to a to-be-processed order SKU3 are: a target tote 2 and a target tote 6. One of the carrying sequences may be: the target tote 1, the target tote 3, the target tote 5, the target tote 2, and the target tote 6.

In some embodiments, if one target tote hits or corresponds to only one target item of one to-be-processed order, the carrying sequence may be consistent with the processing sequence.

Specifically, target totes may be determined based on the order demand of each to-be-processed order corresponding to the target workstation. Then, based on the processing sequence corresponding to each to-be-processed order and SKUs or types of items stored in each of the target totes, the carrying sequence of each of the target totes is determined, so that the carrying sequence of each of the target totes matches the processing sequence corresponding to each to-be-processed order.

Because target totes are not shared between different to-be-processed orders, that is, each of the target totes may correspond to only one to-be-processed order, each of the target totes of each to-be-processed order and the carrying sequence of each of the target totes may be determined by using the to-be-processed order as a unit.

In some embodiments, each of the target totes of each to-be-processed order may be sequentially determined based on the order priority of the to-be-processed order and the order demand of each to-be-processed order.

Optionally, the determining the target totes and the carrying sequence of each of the target totes according to the order demand of the at least one to-be-processed order and the processing sequence corresponding to each to-be-processed order includes: for each to-be-processed order, determining each of the target totes of the to-be-processed order and the carrying sequence of each of the target totes according to the order demand and the processing sequence of the to-be-processed order.

Specifically, a target tote may be sequentially assigned to each of the target items in the processing sequence of each of the target items of the to-be-processed order. That is, based on a quantity of target items in the order demand of the to-be-processed order, the target tote is assigned to each of the target items.

Specifically, to reduce a quantity of target totes corresponding to the to-be-processed order, a tote whose stored goods meet demands of a plurality of target items whose processing sequences are consecutive in the order demand of the to-be-processed order may be preferentially determined as the target tote of the to-be-processed order.

Specifically, based on a quantity of target items in the order demand of the to-be-processed order, whether there is a single tote that meets the order demand may be searched from the totes stored in the warehousing system. Each of the target items required in the order demand of the to-be-processed order is stored in the tote, and a quantity of target items stored in the tote is greater than or equal to the quantity of target items in the order demand of the to-be-processed order. If there is a single tote that meets the order demand, the single tote is determined as the target tote of the to-be-processed order. If there is no single tote that meets the order demand, the target tote is sequentially assigned to each of the target items in the processing sequence of each of the target items of the to-be-processed order. Alternatively, if there is no single tote that meets the order demand, the demand of the target item ranking bottom in the processing sequence in the order demand is removed, to obtain a new order demand. Whether there is a single tote that meets the new order demand is searched from the totes stored in the warehousing system. If there is a single tote that meets the new order demand, the single tote is determined as one target tote of the to-be-processed order, and based on a demand quantity of target items ranking bottom in the processing sequence, one or more totes that meet the demand quantity are determined as other target totes of the to-be-processed order. Alternatively, if there is no single tote that meets the new order demand, demands of two target items ranking bottom in the processing sequence in the order demand are removed, to obtain a new order demand. Whether there is a single tote that meets the new order demand is searched from the totes stored in the warehousing system. If there is a single tote that meets the new order demand, the single tote is determined as one target tote of the to-be-processed order, and based on a demand quantity of two target items ranking bottom in the processing sequence, one or more totes that meet the demand quantity are determined as other target totes of the to-be-processed order. The rest is deduced by analogy, until each of the target totes that meets the order demand of the to-be-processed order is determined.

In some embodiments, the robot includes a mobile chassis, a temporary storage shelving unit, and a retrieving and depositing apparatus. The retrieving and depositing apparatus is configured to retrieve and deposit totes, and the temporary storage shelving unit is configured to store the totes.

In some embodiments, the temporary storage shelving unit of the robot is multi-layered, and each layer may store one target tote.

In some embodiments, when the robot carries each of the target totes based on the carrying instruction, the target totes are sequentially placed on the temporary storage shelving unit of the robot from a bottom layer to a top layer or from a top layer to a bottom layer in the carrying sequence.

In some embodiments, after carrying each of the target totes to the target workstation, the robot sequentially places the target tote stored on each layer of the temporary storage shelving unit of the robot on the target workstation in a setting sequence. The setting sequence may be from the bottom layer to the top layer or from the top layer to the bottom layer. Therefore, the carrying sequence of each of the target totes is a sequence in which each of the target totes reaches the corresponding target workstation.

For example, an example in which the temporary storage shelving unit of the robot has six layers is used. The robot needs to carry six target totes, for example, a tote L11 to a tote L16. A carrying sequence is from the tote L11 to the tote L16. Then, the robot sequentially retrieves the tote L11 to the tote L16, and respectively places the tote L11 to the tote L16 on a first layer to a sixth layer of the temporary storage shelving unit of the robot.

Step S203: Generate a carrying instruction according to the target totes and the carrying sequence of each of the target totes, to control, based on the carrying instruction, a robot to carry each of the target totes.

Specifically, after the target totes and the carrying sequence of each of the target totes are determined, the carrying instruction for the robot may be generated based on the to-be-processed order corresponding to each of the target totes and the carrying sequence of each of the target totes, thereby controlling the robot to retrieve, in the corresponding carrying sequence, each of the target totes corresponding to each to-be-processed order, and carry each of the target totes to the corresponding target workstation.

Optionally, the generating the carrying instruction according to the target totes and the carrying sequence of each of the target totes includes: generating a carrying instruction for at least one robot according to each of the target totes corresponding to each to-be-processed order, the carrying sequence of each of the target totes, and a storage location of each of the target totes.

The storage location of each of the target totes may be a location corresponding to a storage location of a storage shelving unit in which each of the target totes is stored.

Specifically, a tote identification code of the target tote may be used to replace the foregoing storage location. That is, the carrying instruction for the at least one robot is generated according to each of the target totes corresponding to each to-be-processed order, the carrying sequence of each of the target totes, and the tote identification code of each of the target totes. The robot may determine the storage location of each of the target totes based on the tote identification code and a correspondence between the tote identification code and the storage location. The correspondence between the tote identification code and the storage location may be stored in a memory of the robot.

In some embodiments, one robot may carry only a target tote corresponding to one to-be-processed order. In addition, a sequence of each of the target totes carried by the robot in the carrying sequence is consecutive.

Specifically, for each to-be-processed order, a quantity of robots required for the to-be-processed order is determined according to a quantity of target totes corresponding to the to-be-processed order. Then, each of the target totes corresponding to the to-be-processed order is grouped in the carrying sequence of each of the target totes corresponding to the to-be-processed order. Each group of target totes are assigned to one robot, to obtain each of the target totes that corresponds to the to-be-processed order and that needs to be carried by each robot. Then, a carrying instruction for each robot is generated based on the storage location and the carrying sequence of each of the target totes that needs to be carried by each robot.

In some embodiments, each of the target totes of the to-be-processed order should be grouped as evenly as possible, to balance a carrying task of each robot.

Specifically, a quantity of robots required for the to-be-processed order may be a smallest positive integer greater than or equal to a ratio of a quantity of target totes corresponding to the to-be-processed order and a quantity of layers of the temporary storage shelving unit of the robot.

For example, a quantity of target totes corresponding to a to-be-processed order D20 is eight, namely, a tote L21 to a tote L28. A carrying sequence is from the tote L21 to the tote L28. The temporary storage shelving unit of the robot has five layers, and then, the to-be-processed order D20 requires two robots. Totes that need to be carried by one robot may be the tote L21 to the tote L24, and totes that need to be carried by the other robot may be the tote L25 to the tote L28.

Specifically, a total quantity of required robots may be determined according to a total quantity of target totes corresponding to each to-be-processed order, then, target totes that need to be carried by each robot are determined based on the to-be-processed order corresponding to each of the target totes and the carrying sequence of each of the target totes, and then, the carrying instruction for each robot is generated based on the storage location and the carrying sequence of each of the target totes that needs to be carried by each robot.

In some embodiments, one robot may carry target totes of a plurality of to-be-processed orders, and each of the target totes that corresponds to each to-be-processed order and that is carried by the robot is consecutive in a sequence of the carrying sequence.

For example, a quantity of target totes corresponding to a to-be-processed order D30 is four, namely, a tote L31 to a tote L34. A carrying sequence is from the tote L31 to the tote L34. A quantity of target totes corresponding to a to-be-processed order D40 is five, namely, a tote L41 to a tote L46. A carrying sequence is from the tote L41 to the tote L46. A temporary storage shelving unit of the robot has three layers. Then, three robots may be determined to carry target totes of the to-be-processed order D30 and the to-be-processed order D40, for example, a robot R31 to a robot R33. Target totes that need to be carried by the robot R31 may be the tote L31 to the tote L33, target totes that need to be carried by the robot R32 may be the tote L34, the tote L41, and the tote L42, and target totes that need to be carried by the robot R33 may be the tote L43 to the tote L46. A sequence of the robot R31 to the robot R33 may be from the robot R31 to the robot R33, to carry corresponding target totes in sequence, so that each of the target totes corresponding to each to-be-processed order reaches, in the carrying sequence, the target workstation. In this way, target goods corresponding to the to-be-processed order are processed in the processing sequence, such as sorting and packaging.

In some embodiments, when the robot is controlled, based on the carrying instruction, to retrieve the target tote, if the target tote corresponding to the robot includes a plurality of target totes corresponding to the same to-be-processed order, the robot may perform path planning according to a storage location of each of the corresponding target totes, to retrieve each of the corresponding target totes, thereby reducing a walking path of the robot. After the robot retrieves each of the target totes, a layer of the temporary storage shelving unit of the robot on which the target tote is stored may be determined in the carrying sequence corresponding to each of the target totes. For example, a higher carrying sequence indicates a lower or higher layer of the corresponding temporary storage shelving unit.

In some embodiments, when the robot is controlled, based on the carrying instruction, to retrieve the target tote, if the target tote corresponding to the robot includes a plurality of target totes corresponding to the same to-be-processed order, only when the robot retrieves a target tote of a current sequence in the carrying sequence corresponding to the to-be-processed order to the temporary storage shelving unit of the robot, the robot is allowed to retrieve a target tote of a next sequence in the carrying sequence corresponding to the to-be-processed order to the temporary storage shelving unit of the robot, to prevent the robot from disrupting sequences of the target totes when performing retrieving.

This embodiment provides a tote processing method. For a scenario in which the target workstation receives each to-be-processed order that has a requirement on the processing sequence, namely, a scenario in which each of the target items in the order demand of the to-be-processed order needs to be processed in the processing sequence of the to-be-processed order. Based on the order demand of each to-be-processed order and the processing sequence corresponding to each to-be-processed order, each of the target totes to be carried to the target workstation is determined, to enable each of the target totes to correspond to only one to-be-processed order or correspond to only one target item in the order demand of one to-be-processed order, and determine the carrying sequence of each of the target totes, thereby controlling the robot to sequentially carry or place, in the carrying sequence, each of the target totes on the target workstation, to prevent the target totes ranking bottom in the processing sequence from reaching the target workstation before the target totes ranking top in the processing sequence, which leads to a phenomenon that the workstation suspends operations. In addition, by limiting that each of the target totes corresponds to only one to-be-processed order or one demand of one to-be-processed order, a case in which a plurality of to-be-processed orders or a plurality of demands correspond to the same target tote is avoided, thereby ensuring orderliness and smoothness of tote processing, and improving smoothness of sorting by the workstation and order processing efficiency.

FIG. 3 is a flowchart of a tote processing method according to another embodiment of this application. This embodiment is further elaboration on step S203 based on the embodiment shown in FIG. 2, and a step of assigning a target workstation to a to-be-processed order is added before step S201. As shown in FIG. 3, after a plurality of to-be-processed orders are received, the tote processing method provided in this embodiment may include the following steps.

Step S301: Count target items corresponding to an order demand of each to-be-processed order.

Specifically, the target items in the order demand of each to-be-processed order may be sequentially counted, to obtain a list of types of target items corresponding to the workstation. That is, the target items in the order demand of each to-be-processed order corresponding to the workstation are obtained.

Step S302: For each of the target items, obtain a first quantity of candidate totes corresponding to the target items.

The candidate tote is a tote in a warehousing system in which the target items are stored and does not correspond to any order. The tote that does not correspond to any order is a tote that is not hit by any order at a current moment, or a tote that is not determined as a target tote of any order.

Specifically, for each of the target items in the list of types of target items corresponding to the workstation, a quantity of totes (namely, candidate totes) storing the target items stored on a storage shelving unit of the warehousing system is counted, to obtain the first quantity.

Specifically, a storage information table of the warehousing system may be stored in advance in a dispatching device.

The storage information table stores a storage condition of each storage location of each storage shelving unit in the warehousing system, such as whether the totes are stored and tote identification codes of the stored totes. The storage information table may further store a first correspondence. The first correspondence is used to describe items stored in each tote (represented by the tote identification code) and a quantity of items, and to update the storage information table and the first correspondence in real time. Further, the first quantity of the candidate totes corresponding to the target items may be obtained based on the storage information table and the first correspondence.

Step S303: Determine, according to the first quantity of the candidate totes corresponding to the target items and the order demand of each to-be-processed order, the to-be-processed order corresponding to each target workstation, to enable a quantity of target workstations corresponding to the target items to be less than or equal to the first quantity of the candidate totes corresponding to the target items.

To avoid a phenomenon that a quantity of workstations corresponding to the target items is greater than the first quantity of the candidate totes corresponding to the target items, and one target tote needs to be carried to a plurality of workstations, because the to-be-processed order has a requirement on a processing sequence of each of the target items, when the to-be-processed order needs to perform processing on items in the target tote, and when the target tote is located on a workstation of another to-be-processed order or is being carried to the workstation corresponding to the to-be-processed order, processing on the to-be-processed order is interrupted, and processing inefficiency of the to-be-processed order is reduced. Therefore, when a target workstation is assigned to the to-be-processed order, the target workstation is assigned to each to-be-processed order according to the first quantity of the candidate totes corresponding to the target items, and the target items corresponding to the order demand of each to-be-processed order, thereby obtaining the to-be-processed order corresponding to each target workstation, so that the quantity of target workstations corresponding to the target items is less than or equal to the first quantity of the candidate totes corresponding to the target items.

Specifically, if the first quantity of the candidate totes corresponding to specific target items is greater than or equal to a quantity (recorded as a fourth quantity) of to-be-processed orders including the type of target items in the order demand, the type of target items may not be considered when the to-be-processed order corresponding to each target workstation is determined. That is, for only target items whose fourth quantity is less than the first quantity, the to-be-processed order corresponding to each target workstation is determined according to the first quantity of the candidate totes corresponding to the target items and a demand quantity of the target items in the order demand of the to-be-processed order that includes the target items in the order demand, to assign the to-be-processed order that includes the target items in at least two order demands to the same target workstation.

For example, three to-be-processed orders are used as an example, namely, a to-be-processed order D51 to a to-be-processed order D53. The target items include items with SKU51 and items with SKU52. A processing sequence of the to-be-processed order D51 and the to-be-processed order D52 is SKU51-SKU52, and a processing sequence of the to-be-processed order D53 is SKU52-SKU51. An order demand of the to-be-processed order D51 is 15 items with SKU51 and ten items with SKU52, an order demand of the to-be-processed order D52 is 25 items with SKU51 and 20 items with SKU52, and an order demand of the to-be-processed order D53 is 15 items with SKU51 and five items with SKU52. If a quantity of candidate totes storing the items with SKU51 is two, and a quantity of candidate totes storing the items with SKU52 is three, because the quantity (3) of candidate totes corresponding to SKU52 is equal to a quantity (3) of to-be-processed orders requiring the items with SKU52, and a quantity (2) of candidate totes corresponding to SKU51 is less than the quantity (3) of to-be-processed orders requiring the items with SKU51, only the items with SKU51 may be considered when the workstation is assigned to the to-be-processed order. If the target workstation corresponding to each to-be-processed order is different, the items with SKU51 correspond to three workstations, so that one of the candidate totes storing SKU51 needs to be carried to two target workstations, to meet the demand of the corresponding to-be-processed order for the items with SKU51. Then, one of the to-be-processed orders needs to wait for sorting on the candidate tote storing SKU51 to be completed in a previous to-be-processed order, and the candidate tote may be carried to the target workstation corresponding to the to-be-processed order to complete the to-be-processed order. It is assumed that the to-be-processed order is the to-be-processed order D51. Because a processing sequence of SKU51 is before a processing sequence of SKU52, the candidate tote storing SKU52 cannot be sorted when reaching the workstation of the to-be-processed order D51. This greatly reduces overall processing efficiency of the to-be-processed order. To avoid a case in which two workstations need to jointly process one tote, at least two to-be-processed orders need to be assigned to the same target workstation. In addition, because the target items required for the to-be-processed order D51 and the to-be-processed order D52 are the same and a processing sequence of the to-be-processed order D51 and a processing sequence of the to-be-processed order D52 are the same, the to-be-processed order D51 and the to-be-processed order D52 may be assigned to the same workstation, and the to-be-processed order D53 may be assigned to another target workstation.

Optionally, FIG. 4 is a flowchart of an implementation of step S303 in the embodiment shown in FIG. 3 according to this application. As shown in FIG. 4, step S303 may include the following steps.

Step S401: For each of target items, obtain a second quantity of target items stored in candidate totes corresponding to the target items.

Specifically, the second quantity of one or more target items stored in each of the candidate totes may be determined according to tote identifiers of the candidate totes and the first correspondence.

Step S402: For each of the target items, determine, according to a demand quantity of the target items in an order demand of each target order and the second quantity of the target items stored in each of the candidate totes corresponding to the target items, a third quantity of the candidate totes corresponding to the target items required for each target order.

The target order is a to-be-processed order whose order demand includes the target items The demand quantity of the target items is a quantity of target items that need to be retrieved in the order demand of the to-be-processed order or the target order.

Specifically, for each target order that includes the target items in the order demand, a group of candidate totes corresponding to the target order is determined based on the demand quantity of the target items in the order demand of the target order and the second quantity of the target items stored in each of the candidate totes storing the target items, so that a sum of the second quantities of the target items stored in the group of candidate totes is greater than or equal to the demand quantity of the target items in the order demand of the target order, and a difference between the two is as small as possible.

Specifically, for each of the target items, the candidate totes storing the target items may be sorted in a descending sequence of the second quantity, to obtain a first sorting result, and the demand quantity of the target items in the order demand of each target order is sorted in a descending sequence according to the demand quantity of the target items in the order demand, to obtain a second sorting result. According to the second sorting result, a third quantity of the candidate totes required for each target order is sequentially determined. For example, one or more candidate totes are sequentially assigned to the target order in a descending sequence according to the first sorting result, until a sum of the second quantities corresponding to the candidate totes assigned to the target order is greater than or equal to the demand quantity of the target items in the order demand of the target order, thereby obtaining each of the candidate totes corresponding to each target order, and then obtaining the third quantity of the candidate totes required for each target order.

Specifically, for each of the target items, the third quantity of the candidate totes storing the target items that need to be retrieved in each target order is determined according to a ratio of the second quantity of the target items stored in each of the candidate totes storing the target items to the demand quantity of the target items in the order demand of each target order.

For example, an example in which the target items are items with SKU60 and a quantity of target orders is 3 (an order D61 to an order D63) is used. Demand quantities of the items with SKU60 in order demands of the order D61 to the order D63 are: 10, 22, and 16 respectively. Candidate totes storing the items with SKU60 include the tote L61 to a tote L64. Quantities (second quantities) of the items with SKU60 are 18, 14, 8, and 15 respectively. Then, third quantities of candidate totes required for the order D61 to the order D63 are 1, 2, and 1 respectively.

Step S403: For each of the target items, determine, according to the third quantity of the candidate totes corresponding to the target items required for each target order and the first quantity of the candidate totes corresponding to the target items, the to-be-processed order corresponding to each target workstation, to enable a total quantity of candidate totes required for the target workstations corresponding to the target items to be less than or equal to the first quantity of the candidate totes corresponding to the target items.

When a plurality of candidate totes are required to meet the demand quantity of the target items in an order demand of one target order, to avoid a case in which different target workstations correspond to the same target tote, when the to-be-processed order is assigned, a quantity of to-be-processed orders corresponding to each to-be-processed workstation is determined according to the third quantity of the candidate totes required for the demand quantity of the target items in the order demand of each to-be-processed order, and the first quantity of the candidate totes storing the target items, so that when a quantity of totes storing the target items stored in the warehousing system is small, each to-be-processed order including the target items in the order demand may be issued to one workstation or workstations whose quantity is small.

Further, to avoid a case in which a plurality of to-be-processed orders with different processing sequences on the same target workstation correspond to the same target tote, when the target workstation corresponding to the to-be-processed order is determined, the target workstation corresponding to each to-be-processed order may be further determined according to the third quantity, the first quantity, and the processing sequence of each to-be-processed order, so that when a quantity of totes storing the target items stored in the warehousing system is small, each to-be-processed order in which processing sequences of the target items are the same and all order demands include the target items is issued to one workstation or workstations whose quantity is as small as possible.

Specifically, when a quantity of the candidate totes in the warehousing system is not sufficient to simultaneously meet the to-be-processed orders, the to-be-processed order may be processed in batches, that is, a first batch of to-be-processed orders are first issued to the corresponding target workstations, and after the first batch is processed, a next batch of to-be-processed orders are issued.

For example, an example in which the order demand includes three (namely, an order D71 to an order D73) target orders for the target items. Quantities of the candidate totes storing the target items required for the order D71 to the order D73 are 2, 3, and 1 respectively. If a quantity of the candidate totes storing the target items is 4, the order D72 may be assigned to the same target workstation, and the order D73 and the order D71 may be assigned to another target workstation, or the order D71 may be assigned in a next batch or a next period. If a quantity of the candidate totes storing the target items is 3, the order D71 to the order D73 may be assigned to the same target workstation, or the order D71 may be assigned to one target workstation, the order D73 may be assigned to another target workstation, and the order D72 may be assigned in a next batch or a next period. Orders are issued in batches and workstations corresponding to orders in each batch are determined based on the quantity of candidate totes, so that a case in which the quantity of the candidate totes required for specific target items in orders issued in a same batch exceeds the quantity of candidate totes storing the target items is avoided, and a phenomenon that the orders are issued in the same batch, which causes the same candidate tote to correspond to a plurality of target workstations is avoided. As a result, the tote needs to be transferred between the plurality of target workstations in a specific sequence, causing processing on some to-be-processed orders to be interrupted, and processing may continue to be performed after the candidate tote reaches.

Specifically, the target workstation may be preferentially assigned to a target order or a to-be-processed order that requires a large third quantity of the candidate totes corresponding to the target items, or the target workstation may be preferentially assigned to a target order or a to-be-processed order that requires a small third quantity of the candidate totes corresponding to the target items.

Optionally, FIG. 5 is a flowchart of another implementation of step S303 in the embodiment shown in FIG. 3 according to this application. As shown in FIG. 5, step S303 may include the following steps.

Step S501: Combine each to-be-processed order according to each of the target items corresponding to each to-be-processed order and a sequence of each of the target items in a corresponding processing sequence, to obtain a combined order.

Specifically, each to-be-processed order that meets a combination condition in each to-be-processed order may be combined into one combined order.

In some embodiments, each to-be-processed order that meets the combination condition may be each to-be-processed order that requires target items with the same types or SKUs in the order demand.

In some embodiments, each to-be-processed order that meets the combination condition may be each to-be-processed order in which the types of the target items are the same, and a processing sequence corresponding to each to-be-processed order is the same in the order demand. That is, only a parameter, namely, the demand quantity, in the order demand of each to-be-processed order in the combined order is different.

Optionally, the combining each to-be-processed order according to each of the target items corresponding to each to-be-processed order and the sequence of each of the target items in the corresponding processing sequence, to obtain the combined order includes: if a type of target items corresponding to an order demand of a first to-be-processed order and a type of target items corresponding to an order demand of a second to-be-processed order are the same, combining the first to-be-processed order and the second to-be-processed order, to obtain the combined order; or if only a type of target items ranking bottom in a preset sequence of the processing sequence is different among target items corresponding to an order demand of a first to-be-processed order and an order demand of a second to-be-processed order, combining the first to-be-processed order and the second to-be-processed order, to obtain the combined order.

The first to-be-processed order and the second to-be-processed order are used to only refer to different to-be-processed orders, and do not include any limitation meaning.

For example, Table 1 is a table of to-be-processed orders provided in an embodiment of this application. In Table 1, the order identification code is used to uniquely identify one order or one to-be-processed order, S011:20, which indicates that a demand quantity of items with an SKU of S011 in the order demand is 20. A processing sequence of S011, S012, and S013 indicates that target items with SKUs of S011, S012, and S013 in a corresponding to-be-processed order need to be sequentially processed. The rest can be deduced by analogy. Then, among the five to-be-processed orders in Table 1, D001 and D003 may be combined into one combined order, or D001, D002, and D003 may be combined into one combined order.

TABLE 1

| Table of to-be-processed orders | | |
| --- | --- | --- |
| Order identification code | Order demand (SKU: demand quantity) | Processing sequence |
| D001 | S011: 20, S012: 15, and S013: 8 | S011, S012, and S013 |
| D002 | S011: 20, S012: 15, and S014: 8 | S011, S012, and S014 |
| D003 | S011: 12, S012: 10, and S013: 18 | S011, S012, and S013 |
| D004 | S011: 20, S013: 15, and S014: 8 | S011, S013, and S014 |
| D005 | S012: 20 and S013: 20 | S012 and S013 |

Step S502: Assign one target workstation to each combined order.

Specifically, a manner of assigning the target workstation to the combined order is similar to a manner of assigning the target workstation to one to-be-processed order. One to-be-processed order is correspondingly replaced with a combined order including a plurality of to-be-processed orders. For example, one target workstation may be assigned to the combined order according to factors such as an order priority of the combined order and the target items required to be retrieved in the order demand of each to-be-processed order in the combined order. The order priority of the combined order may be determined by an order priority of each to-be-processed order. For example, an order priority with a highest priority in the order priority of each to-be-processed order in the combined order is the order priority of the combined order, or a lowest priority. Workstations adapted to the combined order may be a collection of workstations that can process the target items in the order demand of each to-be-processed order in the combined order.

Step S503: For each of first target items, determine, according to target workstations corresponding to the first target items and a first quantity of candidate totes corresponding to the first target items, the to-be-processed order corresponding to each target workstation from each remaining to-be-processed order from which the combined order is excluded and whose order demand includes the first target items.

The first target items are target items with the same types in the order demand of the to-be-processed order and an order demand of at least one combined order, to enable a quantity of target workstations corresponding to the target items to be less than or equal to the first quantity of the candidate totes corresponding to the target items.

Because the target workstation is assigned to the combined order, some to-be-processed orders corresponding to the target workstations are obtained. In addition, the target items, including the first target items, of each to-be-processed order in the combined order are bound to the corresponding target workstation, and each of the target items currently corresponding to the target workstation, or the target workstation currently corresponding to each of the target items may be obtained.

After the target workstation is assigned to the combined order, for the remaining (or not combined with any to-be-processed order) to-be-processed orders whose order demands include at least one of the same target item (namely, the first target item) as the order demand of the combined order, the target workstation corresponding to the to-be-processed order is determined according to the target workstation currently corresponding to the first target item and the first quantity of the candidate totes corresponding to the first target items. This prevents a quantity of target workstations corresponding to the first target items from being greater than the first quantity of the candidate totes corresponding to the first target items.

Specifically, the target workstation corresponding to the to-be-processed order that includes the first target items in the order demand may be determined according to the quantity of target workstations currently corresponding to the first target items and the first quantity of the candidate totes corresponding to the first target items.

If the quantity of target workstations currently corresponding to the first target items is greater than or equal to the first quantity of the candidate totes corresponding to the first target item, the workstation is no longer assigned to the to-be-processed order that includes the first target items in the remaining (uncombined) order demands.

Step S304: For each target workstation, determine target totes and a carrying sequence of each of the target totes according to an order demand that corresponds to the target workstation and that is of the at least one to-be-processed order and a processing sequence corresponding to each to-be-processed order.

Specifically, after the to-be-processed order corresponding to each target workstation is determined, for each target workstation, each of the target totes corresponding to the target workstation and the carrying sequence of each of the target totes are determined according to the order demand of each to-be-processed order corresponding to the target workstation and a processing sequence that corresponds to or is limited by each to-be-processed order. A specific process is similar to step S202, and is not described herein again.

Step S305: Group each of the target totes according to one or more of a quantity of target totes corresponding to each to-be-processed order, the to-be-processed order corresponding to each of the target totes, the carrying sequence of each of the target totes, and the storage location of each of the target totes, to obtain tote groups.

Specifically, each of the target totes may be grouped in the carrying sequence of each of the target totes, so that each of the target totes with the same sequence in the carrying sequence is grouped into one group.

Specifically, each of the target totes may be grouped according to the to-be-processed order corresponding to each of the target totes and the carrying sequence of each of the target totes, to sequentially group each of the target totes of the same to-be-processed order according to a set step length and in an ascending sequence in the carrying sequence, to obtain tote groups. The set step length may be a quantity of layers of a temporary storage shelving unit of a robot.

In some embodiments, target totes in one tote group may correspond to the same to-be-processed order, and a sequence of each of the target totes in the same tote group in the carrying sequence is consecutive.

For example, an example in which the set step length is six, and target totes corresponding to the to-be-processed order are a tote L81 to a tote L89 is used. A carrying sequence of the nine target totes is from the tote L81 to the tote L89, and then, the nine target totes may be grouped into two groups. One group includes the tote L81 to the tote L86, and the other group includes the tote L87 to the tote L89.

Optionally, the grouping each of the target totes according to one or more of the quantity of target totes corresponding to each to-be-processed order, the to-be-processed order corresponding to each of the target totes, the carrying sequence of each of the target totes, and the storage location of each of the target totes, to obtain the tote groups includes: obtaining the quantity of target totes corresponding to each to-be-processed order; and for each to-be-processed order, grouping, according to the quantity of target totes corresponding to the to-be-processed order and the carrying sequence of each of the target totes, each of the target totes corresponding to the to-be-processed order, to obtain at least one tote group.

Specifically, if the quantity of target totes corresponding to the to-be-processed order is less than or equal to the quantity of layers of the temporary storage shelving unit of the robot, the target totes of the to-be-processed order are directly grouped into one group.

Specifically, whether the quantity of target totes corresponding to the to-be-processed order is greater than the quantity of layers of the temporary storage shelving unit of the robot is first determined; if not, the target totes of the to-be-processed order are directly grouped into one group; and if yes, each of the target totes of the to-be-processed order is grouped based on the quantity of target totes corresponding to the to-be-processed order and the carrying sequence of each of the target totes corresponding to the to-be-processed order, to obtain the tote groups. In addition, the quantity of target totes in the tote groups should be balanced as much as possible when grouping is performed.

Specifically, an average value may be determined based on a ratio of the quantity of target totes corresponding to the to-be-processed order and the quantity of layers of the temporary storage shelving unit of the robot. Based on the average value, the quantity of target totes corresponding to the to-be-processed order, and the carrying sequence of each of the target totes corresponding to the to-be-processed order, each of the target totes of the to-be-processed order is grouped, to obtain the tote groups, so that the quantity of target totes in the tote groups is close to the average value.

For example, an example in which the quantity of layers of the temporary storage shelving unit of the robot is four, and the target totes corresponding to the to-be-processed order are a tote L91 to a tote L99. A carrying sequence of the nine target totes is from the tote L91 to the tote L99, and then, the nine target totes may be grouped into three groups. One group includes the tote L91 to the tote L93, one group includes the tote L94 to the tote L96, and a last group includes the tote L97 to the tote L99.

Optionally, the grouping, according to the quantity of target totes corresponding to the to-be-processed order and the carrying sequence of each of the target totes, each of the target totes corresponding to the to-be-processed order, to obtain at least one tote group includes: when the quantity of target totes corresponding to the to-be-processed order is greater than a first preset quantity, grouping, in the carrying sequence of each of the target totes corresponding to the to-be-processed order and the storage location of each of the target totes, each of the target totes corresponding to the to-be-processed order, to obtain at least two tote groups, where the storage location of each of the target totes corresponding to a same tote group is in a preset range.

A first preset quantity may be the quantity of layers of the temporary storage shelving unit of the robot, or may be a set value, such as 3, 4, 5, or the like.

Specifically, when the quantity of target totes corresponding to the to-be-processed order is large, each of the target totes of the to-be-processed order may be grouped with reference to the carrying sequence and a storage location of each of the target totes corresponding to the to-be-processed order, to group each of the target totes that is close to each other into one group, and reduce a walking distance of the robot when retrieving each of the target totes in the tote group, thereby improving order processing efficiency.

Specifically, for each to-be-processed order, each of the target totes in the preset range of each of the target totes that is consecutive in the carrying sequence and that ranks top in a sequence of the current carrying sequence is grouped into one group in the carrying sequence of each of the target totes of the to-be-processed order, and based on the storage location of each of the target totes, to obtain one tote group. A maximum quantity of target totes in each tote group is a quantity of layers of the temporary storage shelving unit of the robot, so that one robot carries each of the target totes in one tote group to a corresponding target workstation.

For example, if each of the target totes of the to-be-processed order is in the preset range, each of the target totes of the to-be-processed order is grouped into at least one tote group in the carrying sequence and the set step length.

For example, if the quantity of layers of the temporary storage shelving unit of the robot is six, the quantity of target totes of the to-be-processed order is ten, namely, a tote LX1 to a tote LX10. A carrying sequence is sequentially from the tote LX1 to the tote LX10. If the target totes in the preset range of the tote LX1 are the tote LX2 to the tote LX5 and the tote LX8, the tote LX1 to the tote LX5 may be grouped into one tote group. Based on the tote LX6, each of the target totes of the to-be-processed order in the preset range of the tote LX6 may be obtained. If the target totes in the preset range of the tote LX1 are the tote LX7 to the tote LX10, the tote LX6 to the tote LX10 may be grouped into one tote group, so that each of the target totes of the to-be-processed order is grouped into two tote groups.

Optionally, when a quantity of target totes in a tote group corresponding to the to-be-processed order is less than a first preset quantity, a target tote corresponding to a next to-be-processed order may be further added to the tote group, which specifically is: combining each of the target totes in at least one next to-be-processed order with the tote group of the to-be-processed order in the carrying sequence of the each of the target totes, to enable the quantity of target totes in the tote group of the to-be-processed order to be in a first interval, where a lower limit of the first interval is the first preset quantity, and an upper limit of the first interval is a second preset quantity.

In some embodiments, a tote group ranking bottom corresponding to the to-be-processed order may correspond to a plurality of to-be-processed orders, and the tote group ranking bottom may be a last tote group of the to-be-processed order. Specifically, when the quantity of target totes belonging to the to-be-processed order in the tote group ranking bottom in the to-be-processed order is less than the first preset quantity, target totes that are in a target tote group corresponding to a next to-be-processed order and whose quantity ranks top in the third preset quantity in a sequence of the carrying sequence may be added, in the carrying sequence, to the tote group, so that the quantity of target totes in the target tote group is in the first interval.

In some embodiments, any tote group corresponding to the to-be-processed order may correspond to a plurality of to-be-processed orders, such as a middle tote group or a first tote group. That is, when the quantity of target totes belonging to the to-be-processed order in a specific tote group corresponding to the to-be-processed order is less than the first preset quantity, target totes that are in a target tote group corresponding to a next to-be-processed order and whose quantity ranks top in the third preset quantity in a sequence of the carrying sequence may be added, in the carrying sequence, to the tote group, so that the quantity of target totes in the target tote group is in the first interval.

Further, each to-be-processed order may be sorted in advance, such as based on a priority, a user, and a deadline, and each of the target totes corresponding to each to-be-processed order is sequentially grouped according to a sorting result.

For example, an example in which the first preset quantity is three, and the second preset quantity is six is used. If each of target totes in the current to-be-processed order are grouped into three tote groups in the carrying sequence, a quantity of target totes in a first tote group is four, a quantity of target totes in a second tote group is two, and a quantity of target totes in a third tote group is six, target totes in a next to-be-processed order need to be added to the second tote group. If the target totes of the next to-be-processed order are sequentially a tote LX51 to a tote LX59 in the carrying sequence, the tote LX51, the tote LX51 and the tote LX52, the tote LX51 to the tote LX53, or the tote LX51 to the tote LX54 is/are added to the second tote group, and then, each of the remaining target totes of the next to-be-processed order is grouped. The rest can be deduced by analogy.

Optionally, the grouping each of the target totes according to one or more of each of the target totes corresponding to each to-be-processed order, the carrying sequence of each of the target totes, and the storage location of each of the target totes, to obtain the tote groups includes: grouping each of the target totes into a plurality of tote groups according to the storage location of each of the target totes and in the carrying sequence corresponding to each of the target totes, where a quantity of target totes corresponding to each of the tote groups is in a first interval, each of the target totes corresponding to each of the tote groups is in a preset range, and a sequence of each of the target totes corresponding to a same to-be-processed order in each of the tote groups is consecutive in the carrying sequence; a lower limit of the first interval is a first preset quantity, and an upper limit of the first interval is a second preset quantity; a third tote in a first tote group and a fourth tote in a second tote group belong to a first order, and a fifth tote in the first tote group and a sixth tote in the second tote group belong to a second order; a sequence of the third tote in the carrying sequence is before a sequence of the fourth tote in the carrying sequence, and then a sequence of the fifth tote in the carrying sequence is before a sequence of the sixth tote in the carrying sequence; and the first tote group and the second tote group are different tote groups, and the first order and the second order are different to-be-processed orders.

The first interval may be $[N_1, N_2]$, where $N_1=n_i+N\times n_2$, $N_2=(N+1)\times n_2$, and N are natural numbers, $n_i$ is a positive integer less than $n_2$, and $n_2$ is a quantity of layers of the temporary storage shelving unit of the robot.

For example, $n_i$ may be 3, 4, 5, or another positive integer less than $n_2$.

Each to-be-processed order corresponding to the target workstation may be considered as a whole, and each of the target totes is grouped. Specifically, a storage location of each of the target totes corresponding to the target workstation may be counted, and each of the target totes corresponding to the target workstation is grouped based on the storage location of each of the target totes and a sequence of each of the target totes in the carrying sequence, to obtain each of the tote groups corresponding to the target workstation.

Specifically, each of the target totes that is in the preset range and that corresponds to each to-be-processed order whose quantity is in the first interval may be sequentially grouped into one tote group in the carrying sequence.

For example, a quantity of to-be-processed orders is four, namely, an order D301 to an order D304. Each to-be-processed order corresponds to six target totes, and a carrying sequence is an ascending sequence. The six target totes corresponding to the order D301 are a tote L101 to a tote L106, the six target totes corresponding to the order D302 are a tote L201 to a tote L206, the six target totes corresponding to the order D303 are a tote L301 to a tote L306, and the six target totes corresponding to the order D401 are a tote L401 to a tote L406. Based on the storage location and the carrying sequence, a possible grouping condition of the tote groups is: a first group: the tote 101, the tote L201 and the tote L203, and the tote L301 and the tote L401; a second group: the tote L204 to the tote L206, and the tote L302 to the tote L304; a third group: the tote L102 to the tote L106, and the tote L305; and a fourth group: the tote L402 to the tote L406, and the tote L306.

Step S306: Determine the inter-group sequence of each of the tote groups according to the target totes corresponding to the tote groups and in the carrying sequence of each of the target totes.

The inter-group sequence is used to describe an execution sequence of each of the tote groups, and in the inter-group sequence, if a first tote in a tote group of a current sequence and a second tote in a tote group of a next sequence belong to a same to-be-processed order, a sequence of the first tote in the carrying sequence is before a sequence of the second tote in the carrying sequence.

In some embodiments, only after the robot retrieves each of the target totes in a tote group of a current sequence in the inter-group sequence to the temporary storage shelving unit of the robot, the robot is allowed to retrieve each of the target totes in a tote group of a next sequence in the inter-group sequence.

Specifically, if two tote groups include the target tote of the same to-be-processed order, a carrying sequence of the target tote of the to-be-processed order in the tote group that ranks top in the inter-group sequence ranks bottom, and a carrying sequence of the target tote of the to-be-processed order in the tote group that ranks bottom in the inter-group sequence ranks top.

Optionally, in the two tote groups that are adjacent in the inter-group sequence, the target totes belonging to the same to-be-processed order are consecutive in the sequence of the carrying sequence.

Specifically, in two adjacent tote groups, such as a first group and a second group, target totes belonging to the same to-be-processed order are consecutive in the sequence of the carrying sequence.

Optionally, the determining the inter-group sequence of each of the tote groups according to the target totes corresponding to the tote groups and in the carrying sequence of each of the target totes includes: determining the inter-group sequence of each of the tote groups according to a sequence of each of the target totes of at least one third order corresponding to each of the tote groups in a carrying sequence corresponding to the at least one third order, where each of the target totes corresponding to the third order exists in at least two tote groups.

Step S307: Generate the carrying instruction for the at least one robot according to the target totes corresponding to the tote groups, the carrying sequence of each of the target totes, the storage location of each of the target totes, and the inter-group sequence, to enable the at least one robot to carry, in the inter-group sequence, the target totes of the tote groups.

Specifically, each of the tote groups may be assigned to one robot, and then for each robot, a carrying instruction for the robot is generated according to a sequence of each of the target totes in the tote group corresponding to the robot in a carrying sequence and a storage location of each of the target totes, to control the robot to sequentially retrieve each of the target totes in an ascending sequence in the carrying sequence.

Specifically, each of the tote groups may be simultaneously assigned to each robot. When a tote group in a previous sequence in the inter-group sequence is retrieved by the robot (where each of the target totes in the tote group is retrieved by the robot from a storage location to the temporary storage shelving unit), the robot sends a retrieving instruction to a robot that retrieves a corresponding tote group whose inter-group sequence is a next sequence, to control the robot that retrieves the corresponding tote group whose inter-group sequence is the next sequence to retrieve each of the target totes of the tote group whose inter-group sequence is the next sequence. The rest can be deduced by analogy. In this way, the target totes in the tote groups corresponding to the target workstation are carried by the robot to the target workstation.

It should be understood that, carrying to the target workstation mentioned in the embodiments of this application may be placing at an entrance and an exit of goods of the target workstation, or placing on a conveyor connected to the target workstation.

Specifically, a dispatching device may sequentially assign each of the tote groups to each robot in the inter-group sequence, and monitor an execution progress of the robot. When the robot completes retrieving each of the target totes in a tote group in a current sequence in the inter-group sequence, the dispatching device assigns a robot to a tote group in a next sequence in the inter-group sequence. A carrying instruction for the robot is generated based on the carrying sequence and the storage location of each of the target totes in the tote group in the next sequence, to control the robot to carry each of the target totes in the tote group in the next sequence to the target workstation. The rest can be deduced by analogy. In this way, the target totes in the tote groups corresponding to the target workstation are carried by the robot to the target workstation.

Optionally, the generating the carrying instruction for the at least one robot according to the target totes corresponding to the tote groups, the carrying sequence of each of the target totes, the storage location of each of the target totes, and the inter-group sequence, to enable the at least one robot to carry, in the inter-group sequence, the target totes of the tote groups includes: for each of the tote groups, determining a retrieving sequence of each of the target totes in the tote group according to the storage location of each of the target totes in the tote group and a sequence of each of the target totes in the tote group in a corresponding carrying sequence; and generating the carrying instruction for each of the robots according to the target totes corresponding to the tote groups, the carrying sequence of each of the target totes, the storage location of each of the target totes, the inter-group sequence, and a retrieving sequence corresponding to each of the tote groups, to enable each of the robots to sequentially retrieve, in the inter-group sequence and the retrieving sequence, the target totes in the tote groups.

The retrieving sequence is a sequence in which the robot retrieves each of the target totes corresponding to the robot.

Specifically, if each of the target totes in the tote group corresponding to the robot corresponds to one to-be-processed order, the foregoing processing sequence, carrying sequence, and retrieving sequence may be the same sequence.

Specifically, for each of the tote groups, if the target totes in the tote groups corresponding to the robot correspond to a plurality of to-be-processed orders, because there is no sequence requirement between different to-be-processed orders, to reduce a walking path of the robot, the retrieving sequence of each of the target totes in the tote group is determined based on the storage location of each of the target totes, the sequence of each of the target totes in the carrying sequence, and the to-be-processed order corresponding to each of the target totes, so that when retrieving the target totes in the corresponding tote group in the carrying sequence, the robot retrieves each of the target totes of each to-be-processed order that is close to each other according to the storage location of each of the target totes.

For example, target totes corresponding to a to-be-processed order D101 are a target tote LX11 to a target tote LX16, target totes corresponding to a to-be-processed order D201 are a target tote LX21 to a target tote LX26, and target totes corresponding to a to-be-processed order D301 are a target tote LX31 to a target tote LX36. If a tote group corresponding to a robot R1 includes six target totes, which are the target tote LX11 to the target tote LX13 of the to-be-processed order D101, the target tote LX24 and the target tote LX25 of the to-be-processed order D102, and the target tote LX31 of the to-be-processed order D103 respectively. If the target tote LX11, the target tote LX24, the target tote LX25, and the target tote LX31 are located on a same layer of the same storage shelving unit, and the target tote LX12 and the target tote LX13 are located on another storage shelving unit, a retrieving sequence of the tote group corresponding to the robot R1 may be the target tote LX24, the target tote LX25, the target tote LX31, the target tote LX11, the target tote LX12, and the target tote LX13, to reduce the walking path of the robot.

In this embodiment, for a to-be-processed order with a limited processing sequence, each of the target items required for each to-be-processed order are counted based on the order demand of each to-be-processed order. Then, for each of the target items, a target workstation is assigned to each to-be-processed order based on a first quantity of totes (candidate totes) storing the target items in the warehousing system. Then, for each target workstation, each of the target totes corresponding to the target workstation is grouped based on each target workstation and based on factors such as a quantity of target totes corresponding to each to-be-processed order corresponding to the target workstation, the to-be-processed order corresponding to each of the target totes, the carrying sequence of each of the target totes, and the storage location of each of the target totes, to obtain tote groups, an inter-group sequence of each of the tote groups is determined, and one robot is assigned to each of the tote groups based on target totes corresponding to the tote groups and a sequence of each of the target totes in the corresponding carrying sequence, and each robot is controlled to sequentially retrieve, in the inter-group sequence and the carrying sequence, the target totes of each of the tote groups based on the inter-group sequence, the target totes in each of the tote groups, the sequence of each of the target totes in the carrying sequence, and the storage location of each of the target totes, so that each of the target totes reaches the target workstation in an orderly manner, thereby ensuring orderliness of processing of each to-be-processed order, and improving processing efficiency of the to-be-processed order.

FIG. 6 is a schematic diagram of a structure of a tote processing apparatus according to an embodiment of this application. As shown in FIG. 6, the apparatus includes: an order obtaining module 610, a tote determining module 620, and a carrying control module 630.

The order obtaining module 610 is configured to obtain at least one to-be-processed order corresponding to a target workstation; the tote determining module 620 is configured to determine target totes and a carrying sequence of each of the target totes according to an order demand of the at least one to-be-processed order and a processing sequence corresponding to each to-be-processed order; and the carrying control module 630 is configured to generate a carrying instruction according to the target totes and the carrying sequence of each of the target totes, to control, based on the carrying instruction, a robot to carry each of the target totes, where the order demand of the to-be-processed order includes a type and a quantity of target items corresponding to the to-be-processed order, the processing sequence corresponding to the to-be-processed order is a processing sequence of the target items in the order demand of the to-be-processed order, and each of the target totes corresponds to one of the to-be-processed orders or corresponds to one target item in the order demand of one of the to-be-processed orders.

Optionally, the tote determining module 620 is specifically configured to: for each to-be-processed order, determine each of the target totes of the to-be-processed order and the carrying sequence of each of the target totes according to the order demand and the processing sequence of the to-be-processed order.

Correspondingly, the carrying control module 630 is specifically configured to: generate a carrying instruction for at least one robot according to each of the target totes corresponding to each to-be-processed order, the carrying sequence of each of the target totes, and a storage location of each of the target totes, to control, based on the carrying instruction, the robot to carry each of the target totes.

Optionally, the carrying control module 630 includes: a grouping unit, configured to group each of the target totes according to one or more of a quantity of target totes corresponding to each to-be-processed order, the to-be-processed order corresponding to each of the target totes, the carrying sequence of each of the target totes, and the storage location of each of the target totes, to obtain tote groups; an inter-group sequence determining unit, configured to determine an inter-group sequence of each of the tote groups according to target totes corresponding to the tote groups and in the carrying sequence of each of the target totes, where the inter-group sequence is used to describe an execution sequence of each of the tote groups, and in the inter-group sequence, if a first tote in a tote group of a current sequence and a second tote in a tote group of a next sequence belong to a same to-be-processed order, a sequence of the first tote in the carrying sequence is before a sequence of the second tote in the carrying sequence; and a carrying instruction generation unit, configured to generate the carrying instruction for the at least one robot according to the target totes corresponding to the tote groups, the carrying sequence of each of the target totes, the storage location of each of the target totes, and the inter-group sequence, to enable the at least one robot to carry, in the inter-group sequence, the target totes of the tote groups and a carrying sequence.

Optionally, the grouping unit is specifically configured to: obtain the quantity of target totes corresponding to each to-be-processed order; and for each to-be-processed order, group, according to the quantity of target totes corresponding to the to-be-processed order and the carrying sequence of each of the target totes, each of the target totes corresponding to the to-be-processed order, to obtain at least one tote group.

Optionally, the carrying control module 630 further includes: a combination unit, configured to: when a quantity of target totes in a tote group corresponding to the to-be-processed order is less than a first preset quantity, combine each of the target totes in at least one next to-be-processed order with the tote group of the to-be-processed order in the carrying sequence of the each of the target totes, to enable the quantity of target totes in the tote group of the to-be-processed order to be in a first interval, where a lower limit of the first interval is the first preset quantity, and an upper limit of the first interval is a second preset quantity.

Optionally, the grouping unit is specifically configured to: when the quantity of target totes corresponding to the to-be-processed order is greater than a first preset quantity, group, in the carrying sequence of each of the target totes corresponding to the to-be-processed order and the storage location of each of the target totes, each of the target totes corresponding to the to-be-processed order, to obtain at least two tote groups, where the storage location of each of the target totes corresponding to a same tote group is in a preset range.

Optionally, the grouping unit is specifically configured to: group each of the target totes into a plurality of tote groups according to the storage location of each of the target totes and in the carrying sequence corresponding to each of the target totes, where a quantity of target totes corresponding to each of the tote groups is in a first interval, each of the target totes corresponding to each of the tote groups is in a preset range, and a sequence of each of the target totes corresponding to a same to-be-processed order in each of the tote groups is consecutive in the carrying sequence; a lower limit of the first interval is a first preset quantity, and an upper limit of the first interval is a second preset quantity; a third tote in a first tote group and a fourth tote in a second tote group belong to a first order, and a fifth tote in the first tote group and a sixth tote in the second tote group belong to a second order; a sequence of the third tote in the carrying sequence is before a sequence of the fourth tote in the carrying sequence, and then a sequence of the fifth tote in the carrying sequence is before a sequence of the sixth tote in the carrying sequence; and the first tote group and the second tote group are different tote groups, and the first order and the second order are different to-be-processed orders.

Optionally, the inter-group sequence determining unit is configured to: determine the inter-group sequence of each of the tote groups according to a sequence of each of the target totes of at least one third order corresponding to each of the tote groups in a carrying sequence corresponding to the at least one third order, where each of the target totes corresponding to the third order exists in at least two tote groups.

Optionally, in the two tote groups that are adjacent in the inter-group sequence, the target totes belonging to the same to-be-processed order are consecutive in the sequence of the carrying sequence.

Optionally, the carrying instruction generation unit is specifically configured to: for each of the tote groups, determine a retrieving sequence of each of the target totes in the tote group according to the storage location of each of the target totes in the tote group and a sequence of each of the target totes in the tote group in a corresponding carrying sequence; and generate the carrying instruction for each of the robots according to the target totes corresponding to the tote groups, the carrying sequence of each of the target totes, the storage location of each of the target totes, the inter-group sequence, and a retrieving sequence corresponding to each of the tote groups, to enable each of the robots to sequentially retrieve, in the inter-group sequence and the retrieving sequence, the target totes in the tote groups.

Optionally, the apparatus further includes: an order assignment module, configured to determine, according to the order demand of each to-be-processed order, the target workstation corresponding to each to-be-processed order, to obtain the to-be-processed order corresponding to each target workstation.

Optionally, the order assignment module is specifically configured to: count target items corresponding to the order demand of each to-be-processed order; for each of the target items, obtain a first quantity of candidate totes corresponding to the target items, where the candidate tote is a tote in a warehousing system in which the target items are stored and does not correspond to any order; and determine, according to the first quantity of the candidate totes corresponding to the target items and the order demand of each to-be-processed order, the to-be-processed order corresponding to each target workstation, to enable a quantity of target workstations corresponding to the target items to be less than or equal to the first quantity of the candidate totes corresponding to the target items.

Optionally, the order assignment module is specifically configured to: for each of the target items, obtain a second quantity of target items stored in each of the candidate totes corresponding to the target items; for each of the target items, determine, according to a demand quantity of the target items in an order demand of each target order and the second quantity of the target items stored in each of the candidate totes corresponding to the target items, a third quantity of the candidate totes corresponding to the target items required for each target order, where the target order is a to-be-processed order whose order demand includes the target items; and for each of the target items, determine, according to the third quantity of the candidate totes corresponding to the target items required for each target order and the first quantity of the candidate totes corresponding to the target items, the to-be-processed order corresponding to each target workstation, to enable a total quantity of candidate totes required for the target workstations corresponding to the target items to be less than or equal to the first quantity of the candidate totes corresponding to the target items.

Optionally, the order assignment module includes: an order combination unit, configured to combine each to-be-processed order according to each of the target items corresponding to each to-be-processed order and a sequence of each of the target items in a corresponding processing sequence, to obtain a combined order; a first assignment unit, configured to assign one target workstation to each combined order; and a second assignment unit, configured to: for each of first target items, determine, according to target workstations corresponding to the first target items and a first quantity of candidate totes corresponding to the first target items, the to-be-processed order corresponding to each target workstation from each remaining to-be-processed order from which the combined order is excluded and whose order demand includes the first target items, where the first target items are target items of a same type in the order demand of the to-be-processed order and an order demand of at least one combined order.

Optionally, the order combination unit is specifically configured to: if a type of target items corresponding to an order demand of a first to-be-processed order and a type of target items corresponding to an order demand of a second to-be-processed order are the same, combine the first to-be-processed order and the second to-be-processed order, to obtain the combined order; or if only a type of target items ranking bottom in a preset sequence of the processing sequence is different among target items corresponding to an order demand of a first to-be-processed order and an order demand of a second to-be-processed order, combine the first to-be-processed order and the second to-be-processed order, to obtain the combined order.

The tote processing apparatus provided in the embodiments of this application may perform the tote processing method provided in any embodiment of this application, and the corresponding functional modules for performing the method and beneficial effects thereof are provided.

Figure 7:
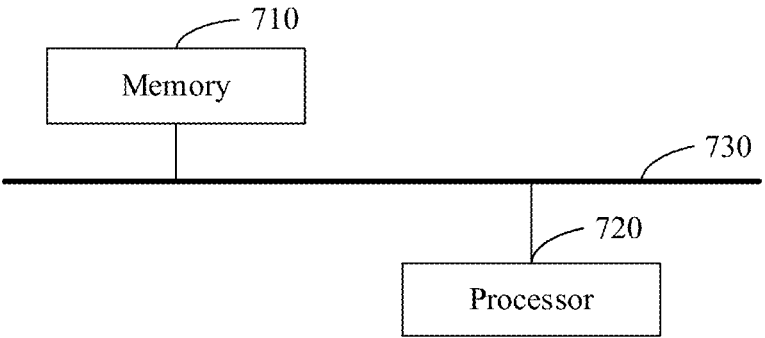
FIG. 7 is a schematic diagram of a structure of a tote processing device according to an embodiment of this application.

FIG. 7 is a schematic diagram of a structure of a tote processing device according to an embodiment of this application. As shown in FIG. 7, the tote processing device includes: a memory 710, a processor 720, and a computer program.

The computer program is stored in the memory 710, and is configured to be executed by the processor 720, to perform the tote processing method according to any one of the embodiments corresponding to FIG. 2 to FIG. 5 in this application.

The memory 710 and the processor 720 are connected through a bus 730.

For understanding of related descriptions, reference may be made to the related descriptions and effects corresponding to steps in FIG. 2 to FIG. 5. Details are not further described herein.

Figure 8:
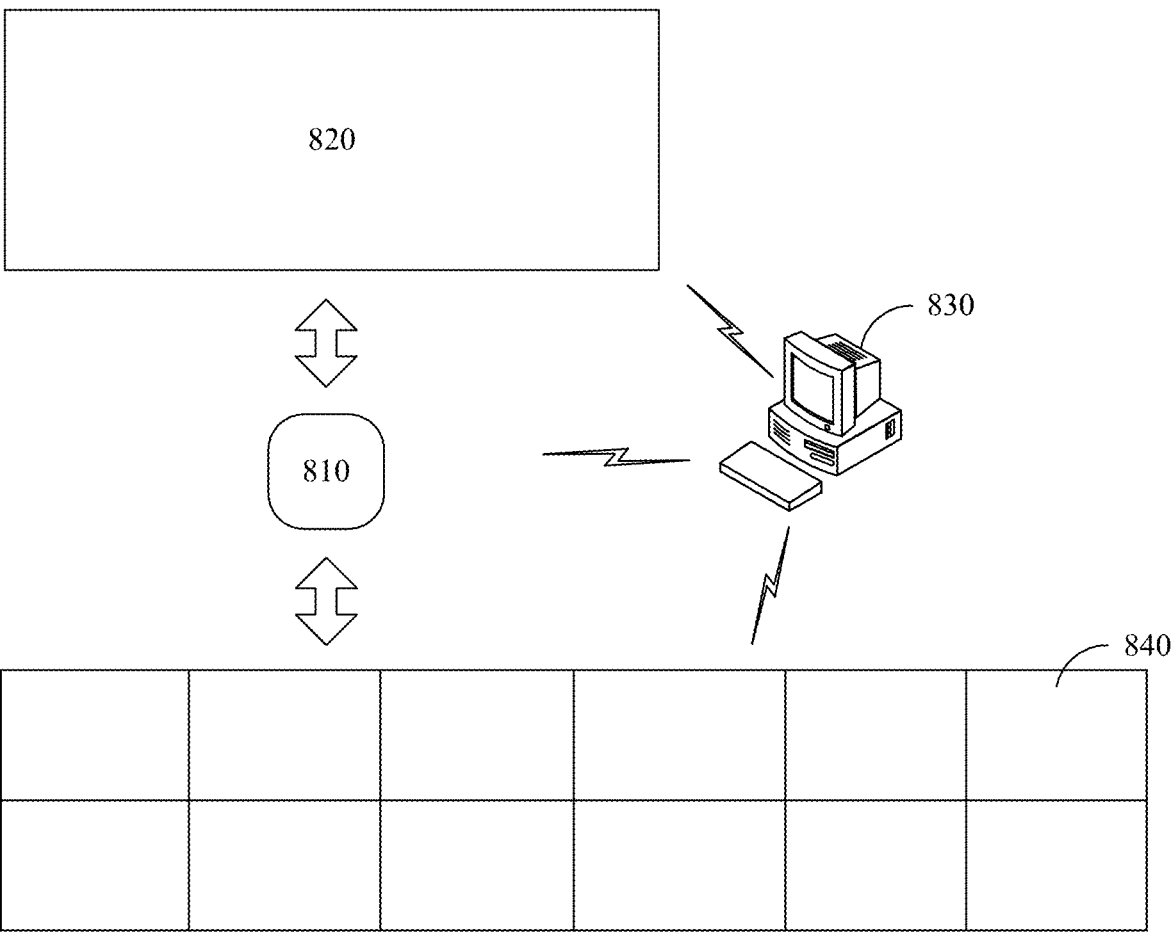
FIG. 8 is a schematic diagram of a structure of a warehousing system according to an embodiment of this application.

FIG. 8 is a schematic diagram of a structure of a warehousing system according to an embodiment of this application. As shown in FIG. 8, the warehousing system includes: a robot 810, a workstation 820, and a tote processing device 830.

The tote processing device 830 is the tote processing device provided in the embodiment shown in FIG. 7 in this application.

In some embodiments, the warehousing system further includes a storage shelving unit 840. The storage shelving unit 840 is configured to store totes. The storage shelving unit includes a plurality of storage locations, such as storage locations of a plurality of rows and a plurality of columns.

In some embodiments, the warehousing system further includes transfer apparatuses such as an unloader, a hoisting mechanism, and a conveyor, to transfer a tote between the robot and the workstation.

An embodiment of this application provides a computer-readable storage medium, storing a computer program. The computer program is executed by a processor, and the tote processing method according to any embodiment of the embodiments corresponding to FIG. 2 to FIG. 5 in this application is performed.

The computer-readable storage medium may be a ROM, a random access memory (RAM), a CD-ROM, a magnetic tape, a floppy disk, an optical data storage device, and the like.

This application further provides a program product. The program product includes an executable computer program, and the executable computer program is stored in the readable storage medium. At least one processor of the tote processing device or the warehousing system may read the computer program from the readable storage medium, and executes the computer program, to enable the tote processing apparatus to perform the tote processing method according to the foregoing implementations.

In the several embodiments provided in this application, it should be understood that the disclosed device and method may be implemented in other manners. For example, the described embodiments of the device are merely examples. For example, division into the modules or units is merely logical function division and may be other division in actual implementation. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate components may or may not be physically separated, and the components displayed as modules may or may not be physical units, i.e., may be located in one place or may be distributed over multiple network units. A part or all of the modules may be selected according to actual requirements to achieve the objectives of the solutions of the embodiments of the present invention.

In addition, functional modules in the embodiments of this application may be integrated into one processing unit, or each of the modules may exist alone physically, or two or more modules may be integrated into one unit. The unit on which the modules are integrated may be implemented in a form of hardware, or may be implemented in a form of a combination of hardware and a software functional unit.

The integrated modules implemented in the form of a software functional module may be stored in a computer-readable storage medium. The software functional module is stored in a storage medium, and includes several instructions for instructing a computer device (which may be a personal computer, a server, or a network device) or a processor (processor) to perform some of the steps of the methods described in the embodiments of this application.

It should be understood that, the processor may be a central processing unit (Central Processing Unit, CPU), or another general-purpose processor, a digital signal processor (Digital Signal Processor, DSP), an application-specific integrated circuit (Application-Specific Integrated Circuit, ASIC), or the like. The general-purpose processor may be a microprocessor, or the processor may be any conventional processor and the like. The steps of the methods disclosed with reference to this application may be directly implemented by a hardware processor, or may be implemented by a combination of hardware and a software module in a processor.

The memory may include a high-speed RAM memory, or may include a non-volatile storage NVM, such as at least one disk memory, which may be further a USB flash drive, a mobile hard disk, a read-only memory, a magnetic disk, or an optical disk.

The bus may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, the bus in the accompanying drawings of this application is not limited to only one bus or one type of bus.

The foregoing storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk. The storage medium may be any available medium accessible to a general-purpose or dedicated computer.

For example, a storage medium is coupled to a processor, so that the processor can read information from the storage medium and write information into the storage medium. Certainly, the storage medium may be a component of the processor. The processor and the storage medium may be located in the application-specific integrated circuit (Application-Specific Integrated Circuit, ASIC). Certainly, the processor and the storage medium may alternatively exist in an electronic device or a master device as discrete components.

A person of ordinary skill in the art may understand that all or some of the steps of the method embodiments may be implemented by a program instructing relevant hardware. The program may be stored in a computer-readable storage medium. When the program is run, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A tote processing method, wherein the method comprises:

obtaining at least one to-be-processed order corresponding to a target workstation;

determining target totes and a carrying sequence of each of the target totes according to an order demand of the at least one to-be-processed order and a processing sequence corresponding to each to-be-processed order; and generating a carrying instruction according to the target totes and the carrying sequence of each of the target totes, to control, based on the carrying instruction, a robot to carry each of the target totes;

wherein the order demand of the to-be-processed order comprises a type and a quantity of target items corresponding to the to-be-processed order, the processing sequence of the to-be-processed order is a placement sequence after target items in the order demand of the to-be-processed order are picked, and each of the target totes corresponds to one of the to-be-processed orders or corresponds to one target item in the order demand of one of the to-be-processed orders;

wherein the determining the target totes and the carrying sequence of each of the target totes according to the order demand of the at least one to-be-processed order and the processing sequence corresponding to each to-be-processed order comprises:

for each to-be-processed order, determining each of the target totes of the to-be-processed order and the carrying sequence of each of the target totes according to the order demand and the processing sequence of the to-be-processed order; and wherein the generating the carrying instruction according to the target totes and the carrying sequence of each of the target totes comprises:

generating the carrying instruction for at least one robot according to each of the target totes corresponding to each to-be-processed order, the carrying sequence of each of the target totes, and a storage location of each of the target totes;

wherein the generating the carrying instruction for the at least one robot according to each of the target totes corresponding to each to-be-processed order, the carrying sequence of each of the target totes, and the storage location of each of the target totes comprises:

grouping each of the target totes according to one or more of a quantity of target totes corresponding to each to-be-processed order, the to-be-processed order corresponding to each of the target totes, the carrying sequence of each of the target totes, and the storage location of each of the target totes, to obtain tote groups;

determining an inter-group sequence of each of the tote groups according to target totes corresponding to the tote groups and in the carrying sequence of each of the target totes, wherein the inter-group sequence is used to describe an execution sequence of each of the tote groups, and in the inter-group sequence, if a first tote in a tote group of a current sequence and a second tote in a tote group of a next sequence belong to a same to-be-processed order, a sequence of the first tote in the carrying sequence is before a sequence of the second tote in the carrying sequence; and generating the carrying instruction for the at least one robot according to the target totes corresponding to the tote groups, the carrying sequence of each of the target totes, the storage location of each of the target totes, and the inter-group sequence, to enable the at least one robot to carry the target totes of the tote groups in the inter-group sequence;

wherein in two tote groups that are adjacent in the inter-group sequence, target totes belonging to the same to-be-processed order are consecutive in a sequence of the carrying sequence.

2. The method according to claim 1, wherein the grouping each of the target totes according to one or more of the quantity of target totes corresponding to each to-be-processed order, the to-be-processed order corresponding to each of the target totes, the carrying sequence of each of the target totes, and the storage location of each of the target totes, to obtain the tote groups comprises:

obtaining the quantity of target totes corresponding to each to-be-processed order; and for each to-be-processed order, grouping, according to the quantity of target totes corresponding to the to-be-processed order and the carrying sequence of each of the target totes, each of the target totes corresponding to the to-be-processed order, to obtain at least one tote group.

3. The method according to claim 2, wherein the method further comprises:

when a quantity of target totes in a tote group corresponding to the to-be-processed order is less than a first preset quantity, combining each of the target totes in at least one next to-be-processed order with the tote group of the to-be-processed order in the carrying sequence of the each of the target totes, to enable the quantity of target totes in the tote group of the to-be-processed order to be in a first interval, wherein a lower limit of the first interval is the first preset quantity, and an upper limit of the first interval is a second preset quantity.

4. The method according to claim 2, wherein the grouping, according to the quantity of target totes corresponding to the to-be-processed order and the carrying sequence of each of the target totes, each of the target totes corresponding to the to-be-processed order, to obtain the at least one tote group comprises:

when the quantity of target totes corresponding to the to-be-processed order is greater than a first preset quantity, grouping, in the carrying sequence of each of the target totes corresponding to the to-be-processed order and according to the storage location of each of the target totes, each of the target totes corresponding to the to-be-processed order, to obtain at least two tote groups;

wherein the storage location of each of the target totes corresponding to a same tote group is in a preset range.

5. The method according to claim 1, wherein the grouping each of the target totes according to one or more of each of the target totes corresponding to each to-be-processed order, the carrying sequence of each of the target totes, and the storage location of each of the target totes, to obtain the tote groups comprises:

grouping each of the target totes into a plurality of tote groups according to the storage location of each of the target totes and in the carrying sequence corresponding to each of the target totes;

wherein a quantity of target totes corresponding to each of the tote groups is in a first interval, the location of each of the target totes corresponding to each of the tote groups is in a preset range, and a sequence of each of the target totes corresponding to a same to-be-processed order in each of the tote groups is consecutive in the carrying sequence; a lower limit of the first interval is a first preset quantity, and an upper limit of the first interval is a second preset quantity;

a third tote in a first tote group and a fourth tote in a second tote group belong to a first order, and a fifth tote in the first tote group and a sixth tote in the second tote group belong to a second order; a sequence of the third tote in the carrying sequence is before a sequence of the fourth tote in the carrying sequence, and then a sequence of the fifth tote in the carrying sequence is before a sequence of the sixth tote in the carrying sequence; the first tote group and the second tote group are different tote groups, and the first order and the second order are different to-be-processed orders.

6. The method according to claim 1, wherein the determining the inter-group sequence of each of the tote groups according to the target totes corresponding to the tote groups and in the carrying sequence of each of the target totes comprises:

determining the inter-group sequence of each of the tote groups according to a sequence of each of the target totes of at least one third order corresponding to each of the tote groups in a carrying sequence corresponding to the at least one third order, wherein each of the target totes corresponding to the third order exists in at least two tote groups.

7. The method according to claim 1, wherein the generating the carrying instruction for the at least one robot according to the target totes corresponding to the tote groups, the carrying sequence of each of the target totes, the storage location of each of the target totes, and the inter-group sequence, to enable the at least one robot to carry, in the inter-group sequence, the target totes of the tote groups comprises:

for each of the tote groups, determining a retrieving sequence of each of the target totes in the tote group according to the storage location of each of the target totes in the tote group and a sequence, in a corresponding carrying sequence, of each of the target totes in the tote group; and generating the carrying instruction for each of the robots according to the target totes corresponding to the tote groups, the carrying sequence of each of the target totes, the storage location of each of the target totes, the inter-group sequence, and a retrieving sequence corresponding to each tote group, to enable each of the robots to sequentially retrieve, in the inter-group sequence and the retrieving sequence, the target totes in the tote groups.

8. The method according to claim 1, wherein the method further comprises:

determining, according to the order demand of each to-be-processed order, the target workstation corresponding to each to-be-processed order, to obtain the to-be-processed order corresponding to each target workstation.

9. The method according to claim 8, wherein the determining, according to the order demand of each to-be-processed order, the to-be-processed order corresponding to each target workstation comprises:

counting target items corresponding to the order demand of each to-be-processed order;

for each of the target items, obtaining a first quantity of candidate totes corresponding to the target items, wherein the candidate tote is a tote in a warehousing system in which the target items are stored and does not correspond to any order; and determining, according to the first quantity of the candidate totes corresponding to the target items and the order demand of each to-be-processed order, the to-be-processed order corresponding to each target workstation, to enable a quantity of target workstations corresponding to the target items to be less than or equal to the first quantity of the candidate totes corresponding to the target items.

10. The method according to claim 9, wherein the determining, according to the first quantity of the candidate totes corresponding to the target items and the order demand of each to-be-processed order, the to-be-processed order corresponding to each target workstation, to enable a quantity of target workstations corresponding to the target items to be less than or equal to the first quantity of the candidate totes corresponding to the target items comprises:

for each of the target items, obtaining a second quantity of target items stored in each of the candidate totes corresponding to the target items;

for each of the target items, determining, according to a demand quantity of the target items in an order demand of each target order and the second quantity of the target items stored in each of the candidate totes corresponding to the target items, a third quantity of the candidate totes corresponding to the target items required for each target order, wherein the target order is a to-be-processed order whose order demand comprises the target items; and for each of the target items, determining, according to the third quantity of the candidate totes corresponding to the target items required for each target order and the first quantity of the candidate totes corresponding to the target items, the to-be-processed order corresponding to each target workstation, to enable a total quantity of candidate totes required for the target workstations corresponding to the target items to be less than or equal to the first quantity of the candidate totes corresponding to the target items.

11. The method according to claim 9, wherein the determining, according to the first quantity of the candidate totes corresponding to the target items and the order demand of each to-be-processed order, the to-be-processed order corresponding to each target workstation comprises:

combining each to-be-processed order according to each of the target items corresponding to each to-be-processed order and a sequence of each of the target items in a corresponding processing sequence, to obtain a combined order;

assigning one target workstation to each combined order; and for each of first target items, determining, according to target workstations corresponding to the first target items and a first quantity of candidate totes corresponding to the first target items, the to-be-processed order corresponding to each target workstation from each remaining to-be-processed order from which the combined order is excluded and whose order demand comprises the first target items, wherein the first target items are target items of a same type in the order demand of the to-be-processed order and an order demand of at least one combined order.

12. The method according to claim 11, wherein the combining each to-be-processed order according to each of the target items corresponding to each to-be-processed order and the sequence of each of the target items in the corresponding processing sequence, to obtain the combined order comprises:

if a type of target items corresponding to an order demand of a first to-be-processed order and a type of target items corresponding to an order demand of a second to-be-processed order are the same, combining the first to-be-processed order and the second to-be-processed order, to obtain the combined order; or if only a type of target items ranking bottom in a preset sequence of the processing sequence is different among target items corresponding to an order demand of a first to-be-processed order and an order demand of a second to-be-processed order, combining the first to-be-processed order and the second to-be-processed order, to obtain the combined order.

13. A tote processing device, comprising:

a memory storing computer-executable instructions; and at least one processor, configured to execute the computer-executable instructions stored in the memory, to enable the at least one processor to:

obtain at least one to-be-processed order corresponding to a target workstation;

determine target totes and a carrying sequence of each of the target totes according to an order demand of the at least one to-be-processed order and a processing sequence corresponding to each to-be-processed order; and generate a carrying instruction according to the target totes and the carrying sequence of each of the target totes, to control, based on the carrying instruction, a robot to carry each of the target totes;

wherein the order demand of the to-be-processed order comprises a type and a quantity of target items corresponding to the to-be-processed order, the processing sequence of the to-be-processed order is a placement sequence after target items in the order demand of the to-be-processed order are picked, and each of the target totes corresponds to one of the to-be-processed orders or corresponds to one target item in the order demand of one of the to-be-processed orders;

wherein the at least one processor is configured to:

determine, for each to-be-processed order, each of the target totes of the to-be-processed order and the carrying sequence of each of the target totes according to the order demand and the processing sequence of the to-be-processed order;

group each of the target totes according to one or more of a quantity of target totes corresponding to each to-be-processed order, the to-be-processed order corresponding to each of the target totes, the carrying sequence of each of the target totes, and the storage location of each of the target totes, to obtain tote groups;

determine an inter-group sequence of each of the tote groups according to target totes corresponding to the tote groups and in the carrying sequence of each of the target totes, wherein the inter-group sequence is used to describe an execution sequence of each of the tote groups, and in the inter-group sequence, if a first tote in a tote group of a current sequence and a second tote in a tote group of a next sequence belong to a same to-be-processed order, a sequence of the first tote in the carrying sequence is before a sequence of the second tote in the carrying sequence; and generate the carrying instruction for the at least one robot according to the target totes corresponding to the tote groups, the carrying sequence of each of the target totes, the storage location of each of the target totes, and the inter-group sequence, to enable the at least one robot to carry the target totes of the tote groups in the inter-group sequence;

wherein in two tote groups that are adjacent in the inter-group sequence, target totes belonging to the same to-be-processed order are consecutive in a sequence of the carrying sequence.

14. The tote processing device according to claim 13, wherein the at least one processor is configured to:

count target items corresponding to the order demand of each to-be-processed order;

for each of the target items, obtain a first quantity of candidate totes corresponding to the target items, wherein the candidate tote is a tote in a warehousing system in which the target items are stored and does not correspond to any order; and determine, according to the first quantity of the candidate totes corresponding to the target items and the order demand of each to-be-processed order, the to-be-processed order corresponding to each target workstation, to enable a quantity of target workstations corresponding to the target items to be less than or equal to the first quantity of the candidate totes corresponding to the target items.

15. A non-transitory computer-readable storage medium, wherein the computer-readable storage medium stores computer-executable instructions; and when executing the computer-executable instructions, a processor is configured to:

obtain at least one to-be-processed order corresponding to a target workstation;

determine target totes and a carrying sequence of each of the target totes according to an order demand of the at least one to-be-processed order and a processing sequence corresponding to each to-be-processed order; and generate a carrying instruction according to the target totes and the carrying sequence of each of the target totes, to control, based on the carrying instruction, a robot to carry each of the target totes;

wherein the order demand of the to-be-processed order comprises a type and a quantity of target items corresponding to the to-be-processed order, the processing sequence of the to-be-processed order is a placement sequence after target items in the order demand of the to-be-processed order are picked, and each of the target totes corresponds to one of the to-be-processed orders or corresponds to one target item in the order demand of one of the to-be-processed orders;

wherein when executing the computer-executable instructions, the processor is configured to:

determine, for each to-be-processed order, each of the target totes of the to-be-processed order and the carrying sequence of each of the target totes according to the order demand and the processing sequence of the to-be-processed order;

group each of the target totes according to one or more of a quantity of target totes corresponding to each to-be-processed order, the to-be-processed order corresponding to each of the target totes, the carrying sequence of each of the target totes, and the storage location of each of the target totes, to obtain tote groups;

determine an inter-group sequence of each of the tote groups according to target totes corresponding to the tote groups and in the carrying sequence of each of the target totes, wherein the inter-group sequence is used to describe an execution sequence of each of the tote groups, and in the inter-group sequence, if a first tote in a tote group of a current sequence and a second tote in a tote group of a next sequence belong to a same to-be-processed order, a sequence of the first tote in the carrying sequence is before a sequence of the second tote in the carrying sequence; and generate the carrying instruction for the at least one robot according to the target totes corresponding to the tote groups, the carrying sequence of each of the target totes, the storage location of each of the target totes, and the inter-group sequence, to enable the at least one robot to carry the target totes of the tote groups in the inter-group sequence;

wherein in two tote groups that are adjacent in the inter-group sequence, target totes belonging to the same to-be-processed order are consecutive in a sequence of the carrying sequence.

* * * * *